(12) United States Patent
Kortunov et al.

(10) Patent No.: US 9,028,785 B2
(45) Date of Patent: May 12, 2015

(54) HIGH $CO_2$ TO AMINE ADSORPTION CAPACITY $CO_2$ SCRUBBING PROCESSES

(75) Inventors: Pavel Kortunov, Flemington, NJ (US); Lisa S. Baugh, Ringoes, NJ (US); David C. Calabro, Bridgewater, NJ (US); Michael Siskin, Westfield, NJ (US)

(73) Assignee: Exxonmobil Reseach and Engineering Company, Annandale, NJ (US)

( * ) Notice: Subject to any disclaimer, the term of this patent is extended or adjusted under 35 U.S.C. 154(b) by 876 days.

(21) Appl. No.: 13/228,999

(22) Filed: Sep. 9, 2011

(65) Prior Publication Data
US 2012/0063979 A1    Mar. 15, 2012

Related U.S. Application Data

(60) Provisional application No. 61/420,960, filed on Dec. 8, 2010, provisional application No. 61/381,281, filed on Sep. 9, 2010, provisional application No. 61/381,294, filed on Sep. 9, 2010, provisional application No. 61/381,351, filed on Sep. 9, 2010, provisional application No. 61/420,978, filed on Dec. 8, 2010, provisional application No. 61/421,048, filed on Dec. 8, 2010.

(51) Int. Cl.
*B01D 53/62* (2006.01)
*B01D 53/96* (2006.01)
(Continued)

(52) U.S. Cl.
CPC ........ *B01D 53/1475* (2013.01); *B01D 53/1493* (2013.01); *B01D 53/62* (2013.01); *B01D 2252/20415* (2013.01); *B01D 2252/20421* (2013.01); *B01D 2252/20426* (2013.01); *B01D 2252/20431* (2013.01); *B01D 2252/20478* (2013.01); *B01D 2252/2056* (2013.01);
(Continued)

(58) Field of Classification Search
None
See application file for complete search history.

(56) References Cited

U.S. PATENT DOCUMENTS

| 3,347,621 A | 10/1967 | Papadopoulos et al. |
| 3,794,586 A | 2/1974 | Kimura et al. |

(Continued)

FOREIGN PATENT DOCUMENTS

| CN | 1354036 | 6/2002 |
| CN | 101279181 | 10/2008 |

(Continued)

OTHER PUBLICATIONS

NCBI, "Ethanolamine." National Center for Biotechnology Information. No pub. date; viewed on Sep. 29, 2014 at http://pubchem.ncbi.nlm.nih.gov/summary/summary.cgi?cid=700.*

(Continued)

*Primary Examiner* — Stanley Silverman
*Assistant Examiner* — Daniel Berns
(74) *Attorney, Agent, or Firm* — Malcome D. Keen; David M. Weisberg; Andrew T. Ward

(57) ABSTRACT

A $CO_2$ amine scrubbing process uses an absorbent mixture combination of an amine containing a primary amino group $CO_2$ sorbent in combination with a non-nucleophilic relatively stronger base. The weaker base(s) are nucleophilic and have the ability to react directly with the $CO_2$ in the gas stream while the relatively stronger bases act as non-nucleophilic promoters for the reaction between the $CO_2$ and the weaker base. Two moles of $CO_2$ can be taken up by the primary amine groups in a dicarboxylation reaction, affording the potential for a highly efficient scrubbing process.

20 Claims, 5 Drawing Sheets

(51) Int. Cl.
  *B01D 53/14*    (2006.01)
  *B01D 53/78*    (2006.01)
(52) U.S. Cl.
  CPC ............. *B01D2252/30* (2013.01); *Y02C 10/04* (2013.01); *Y02C 10/06* (2013.01)

(56) References Cited

U.S. PATENT DOCUMENTS

| | | |
|---|---|---|
| 4,100,257 A | 7/1978 | Sartori et al. |
| 4,112,051 A | 9/1978 | Sartori et al. |
| 4,410,335 A | 10/1983 | Childs |
| 4,474,682 A | 10/1984 | Billenstein et al. |
| 4,539,189 A | 9/1985 | Starkston et al. |
| 4,624,838 A | 11/1986 | Pan et al. |
| 4,636,323 A | 1/1987 | Nagai et al. |
| 5,057,122 A | 10/1991 | Blain et al. |
| 5,068,046 A | 11/1991 | Blain et al. |
| 5,565,145 A | 10/1996 | Watson et al. |
| 5,779,814 A * | 7/1998 | Fellers et al. .................. 134/20 |
| 5,879,433 A | 3/1999 | Gallup et al. |
| 6,075,000 A | 6/2000 | Rohrbaugh et al. |
| 6,140,276 A | 10/2000 | Duncum et al. |
| 6,552,239 B1 * | 4/2003 | Brands .......................... 585/358 |
| 6,579,343 B2 | 6/2003 | Brennecke et al. |
| 6,586,106 B2 | 7/2003 | Shibuya et al. |
| 2002/0189444 A1 | 12/2002 | Brennecke et al. |
| 2004/0035293 A1 | 2/2004 | Davis, Jr. |
| 2005/0129598 A1 | 6/2005 | Chinn et al. |
| 2005/0183337 A1 | 8/2005 | Cadours et al. |
| 2005/0239974 A1 | 10/2005 | Grimm et al. |
| 2005/0257421 A1 | 11/2005 | Siggelkow et al. |
| 2006/0188423 A1 | 8/2006 | Cadours et al. |
| 2006/0251558 A1 | 11/2006 | Chinn et al. |
| 2007/0286783 A1 | 12/2007 | Carrette et al. |
| 2008/0004362 A1 | 1/2008 | Masuda et al. |
| 2008/0025893 A1 | 1/2008 | Asprion et al. |
| 2008/0050296 A1 | 2/2008 | Tontiwachwuthikul et al. |
| 2008/0141858 A1 | 6/2008 | Liu et al. |
| 2008/0187485 A1 | 8/2008 | Magne-Drisch et al. |
| 2009/0136402 A1 | 5/2009 | Heldebrandt et al. |
| 2009/0263302 A1 | 10/2009 | Hu |
| 2009/0291874 A1 | 11/2009 | Bara et al. |
| 2010/0288126 A1 | 11/2010 | Agar et al. |
| 2011/0293498 A1 | 12/2011 | Lahary et al. |
| 2013/0164200 A1 * | 6/2013 | Lail et al. ...................... 423/210 |

FOREIGN PATENT DOCUMENTS

| | | |
|---|---|---|
| DE | 3504538 | 9/1985 |
| DE | 102008007087 A1 | 8/2009 |
| DE | 102008013738 A1 | 9/2009 |
| EP | 0 349 787 B1 | 8/1994 |
| EP | 0692558 | 1/1996 |
| FR | 2918386 A1 | 7/2007 |
| GB | 1 473 103 A | 5/1977 |
| JP | 56145984 | 11/1981 |
| JP | 61225293 | 10/1986 |
| JP | 2003193385 | 7/2003 |
| JP | 2005126279 | 5/2005 |
| JP | 2006150298 | 6/2006 |
| JP | 2007197503 | 8/2007 |
| WO | 2006103812 A1 | 10/2006 |
| WO | 2007/003618 A1 | 1/2007 |
| WO | 2008/007320 A3 | 1/2008 |
| WO | 2008/015217 A1 | 2/2008 |
| WO | 2008068411 A2 | 6/2008 |
| WO | 2008/094846 A1 | 8/2008 |
| WO | 2010089257 A1 | 8/2010 |

OTHER PUBLICATIONS

Ripin et al., "pKa's of Nitrogen Acids." Nov. 4, 2005. Available at http://evans.rc.fas.harvard.edu/pdf/evans_pKa_table.pdf.*

C. Cadena et al., "Why is CO2 So Soluble in Imidazolium-Based Ionic Liquids?", J. Am. Chem. Soc., 126 (2004), 5300-8.
A. Yokozeki et al., "Physical and Chemical Absorptions of Carbon Dioxide in Room-Temperature Ionic Liquids", J. Phys. Chem. B, 112 (2008), 16654-63.
M.B. Shiflett et al., "Phase behavior of {carbon dioxide + [bmim][Ac]} mixtures", J. Chem. Thermo. 40 (2008), 25-31.
E.J. Maginn, "Design and Evaluation of Ionic Liquids as Novel CO2 Absorbents", University of Notre Dame Quarterly Technical Report, May 31, 2005, DOE Award No. DE-FG26-04NT42122.
Z.J. Dijkstra et al., "Formation of carbamic acid in organic solvents and in supercritical carbon dioxide", J. Supercritical Fluids, 41 (2007), 109-114.
K. Masuda et al., "Studies on the solvent dependence of the carbamic acid formation from omega-(1-naphthyl) alkylamines and carbon dioxide", Tetrahedron, 61 (2005), 213-229.
E.M. Hampe & D.M. Rudkevich, "Reversible covalent chemistry of CO2", Chem. Commun. (2002), 1450-51.
D.J. Heldebrant et al., "CO2-Binding Organic Liquids (CO2BOLs) for Acid Gas Capture", Pacific Northwest Laboratory.
P.G. Jessop et al., "Reversible nonpolar-to-polar solvent", Nature, v. 436, Aug. 25, 2005, p. 1102.
D.J. Heldebrant et al., "Organic liquid CO2 capture agents with high gravimetric CO2 capacity", Energy & Environmental Science, 1 (2008), 487-93.
L. Phan et al., "Switchable Solvents Consisting of Amidine/Alcohol or Guanidine/Alcohol Mixtures", Ind. Eng. Chem. Res., 47 (2008), 539-45.
S. Dinda et al., "Kinetics of reactive absorption of carbon dioxide with solutions of aniline in carbon tetrachloride and chloroform", Chemical Engineering Journal, 136 (2008), 349-357.
M. Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, 9 (2007), 90-98.
A.M. Voutchkova et al., "Imidazolium Carboxylates as Versatile and Selective N-Heterocyclic Carbene Transfer Agents: Synthesis, Mechanism, and Applications", J. Amer. Chem. Soc., 129 (2007), 12834-46.
I. Tommasi & F. Sorrentino, "Synthesis of 1,3-dialkylimidazolium-2-carboxylates by direct carboxylation of 1,3-dialkylimidazolium chlorides with CO2", Tetrahedron Letters, 47 (2006), 6453-6.
H.A. Duong et al., "Reversible carboxylation of N-heterocyclic carbenes", Chem. Commun., 2004, 112-3.
A. Tudose et al., "Imidazol(in)ium-2-carboxylates as N-heterocyclic carbene precursors in ruthenium-arene catalysts for olefin metathesis and cyclopropanation", J. Organomet. Chem., 691 (2006), 5356-65.
N.J. Bridges et al., "An Intermediate for the Clean Synthesis of Ionic Liquids: Isolation and Crystal Structure of 1,3-Dimethylimidazolium Hydrogen Carbonate Monohydrate", Chem. Eur., 13 (2007), 5207-12.
H. Zhou et al., "CO2 Adducts of N-Heterocyclic Carbenes: Thermal Stability and Catalytic Activity toward the Coupling of CO2 with Epoxides", J. Org. Chem., 73 (2008), 8039-44.
E. Sada et al., "Reaction Kinetics of Carbon Dioxide with Amines in Non-aqueous Solvents", Chemical Engineering Journal, 33 (1986), 87-95.
P.J. Carvalho et al., "Specific Solvation Interactions of CO2 on Acetate and Trifluoroacetate Imidazolium Based Ionic Liquids at High Pressures", J. Phys. Chem. B, 113 (2009), 6803-12.
E.M. Hampe & D.M. Rudkevich, "Exploring reversible reactions between CO2 and amines", Tetrahedron, 59 (2003), 9619-25.
Y. Kayaki et al., "Utilization of N,N-Dialkylcarbamic Acid Derived from Secondary Amines and Supercritical Carbon Dioxide: Stereoselective Synthesis of Z Alkenyl Carbamates with a CO2-Soluble Ruthenium-P(OC2H5)3 Catalyst", Chem. Asian J., 3 (2008), 1865-70.
E. Sada et al., "Chemical Kinetics of the Reaction of Carbon Dioxide with Ethanolamines in Nonaqueous Solvents", AIChE Journal, 31(8), Aug. 1985, 1297-1303.
D.J. Heldebrant et al., "CO2-binding organic liquids (CO2BOLs) for post-combustion CO2 capture", Energy Procedia, 1 (2009), 1187-95.

(56) References Cited

OTHER PUBLICATIONS

G.F. Versteeg et al., "On the Kinetics Between CO2 and Alkanolamines both in Aqueous and Non-Aqueous Solutions. An Overview", Chem. Eng. Comm., 144 (1996), 113-58.

G.F. Versteeg & W.P.M. Van Swaaij, "On the Kinetics Between CO2 and Alkanolamines Both in Aqueous and Non-Aqueous Solutions—I. Primary and Secondary Amines", Chemical Engineering Science, 43(3), 1988, 573-85.

R.A. Davis & O.C. Sandall, "Kinetics of the Reaction of Carbon Dioxide With Secondary Amines in Polyethylene Glycol", Chemical Engineering Science, 48(18), 1993, 3187-93.

J.E. Bara et al., "Gas Processing With Ionic Liquid-Amine Solvents", URS Corporation (Denver, Colorado), 2010.

M. Kim & J.-W. Park, "Reversible, solid state capture of carbon dioxide by hydroxylated amidines", Chem. Commun., 46 (2010), 2507-9.

E.J. Maginn et al., "Development of new post-combustion carbon dioxide capture solvents: Are ionic liquids the answer?", 235th ACS National Meeting, Apr. 6-10, 2008, Abstract.

S. Dinda et al., "Kinetics of Reactive Absorption of Carbon Dioxide and Solutions of Aniline in Nonaqueous Aprotic Solvents", Ind. Eng. Chem. Res., 45 (2006), 6632-9.

D. Camper et al., "Room-Temperature Ionic Liquid-Amine Solutions: Tunable Solvents for Efficient and Reversible Capture of CO2", Ind. Eng. Chem. Res., 47 (2008), 8496-8.

J.E. Bara et al., "Guide to CO2 Separations in Imidazolium-Based Room-Temperature Ionic Liquids", Ind. Eng. Chem. Res., 48 (2009), 2739-51.

J.A. Tossell, "Catching CO2 in a Bowl", Inorganic Chemistry, 48 (2009), 7105-10.

H. Zhou et al., "N-Heterocyclic Carbene Functionalized Polymer for Reversible Fixation—Release of CO2", Macromolecules, 42 (2009), 5419-21.

Y. Ito, "Formation of Carbamic Acids and Their Photochemistry", Kokagaku Kyokai, 33(3), 2002, 205-12. English Abstract only.

N. Imaishi et al., "Chemical absorption of carbon dioxide by nonaqueous solutions of cyclohexylamine", Kagaku Kogaku Robunshu, 7(3), 1981, 261-6. English Abstract only.

D. Wan et al., "Can Nonspecific Host-Guest Interaction lead to Highly Specific Encapsulation by a Supramolecular Nanocapsule?", Macromolecules, 42 (2009), 6448-56.

V.L. Yushko et al., "Effect of water content on the solubility of carbon dioxide in solutions of monoethanolamine in sulfolane", Voprosy Khimii i Khimicheskoi Tekhnologii, 30 (1973), 3-5. English Abstract only.

E. Sada et al., "Chemical Absorption of Carbon Dioxide into Ethanolamine Solutions of Polar Solvent", AIChE Journal, 32(2), Feb. 1986, 347-9.

K. Yogish "Absorption of CO2 in Some Hybrid Solvents", Can. J. Chem. Eng., 68 (1990), 511-2.

P.S. Kumar et al., "New absorption liquids for the removal of CO2 from dilute gas streams using membrane contactors", Chem. Eng. Sci., 57 (2002), 1639-51.

K. Takeshita & A. Kitamoto, "Relation between separation factor of carbon isotope and chemical reaction of carbon dioxide with amine in nonaqueous solvent", J. Chem. Eng. Japan, 22(5), 1989, 447-54. English Abstract only.

K. Takeshita & A. Kitamoto, "Chemical equilibria of absorption of carbon dioxide into nonaqueous solution of amine", J. Chem. Eng. Japan, 21(4), 1988, 411-7. English Abstract only.

G.F. Versteeg & W.P.M. Van Swaaij, "On the Kinetics Between CO2 and Alkanolamines Both in Aqueous and Non-Aqueous Solutions—II. Tertiary Amines", Chemical Engineering Science, 43(3), 1988, 587-91.

O.R. Rivas, "Solvent selectivity for the purification of natural gases", Ph.D. Thesis, U.C. Berkeley, 1978, Abstract.

S. Xu et al., "Kinetics of the Reaction of Carbon Dioxide with 2-Amino-2-methyl-1-propanol Solutions", Chem. Eng. Sci., 51(6), 1996, 841-50.

R.J. Littell et al., "Physical absorption into non-aqueous solutions in a stirred cell reactor", Chem. Eng. Sci., 46(12), 1991, 3308-13.

I.L. Leites et al., "Removal of carbon dioxide from gas by solutions of monoethanolamine in various diluents", Khimicheskaya Promyshlennost, 8 (1975), 599-602. English Abstract only.

K. Takeshita et al., "Separation of carbon isotopes by using the chemical reaction of carbon dioxide with amines in nonaqueous solution", Kagaku Kogaku, 55(6), 1991, 426-8. English Abstract only.

Y. Liang et al., "Unimolecular Micelle Derived from hyperbranched Polyethyleneimine with Well-Defined Hybrid Shell of Poly(ethylene oxide) and Polystyrene: A Versatile Nanocapsule", J. Polym. Sci., Pt. A: Polym. Chem., 48 (2010), 681-91.

E.D. Bates et al., "CO2 Capture by a Task-Specific Ionic Liquid", J. Am. Chem. Soc., 124(6), 2002, 926ff.

J.D. Holbrey et al., "1,3-Dimethylimidazolium-2-carboxylate: the unexpected synthesis of an ionic liquid precursor and carbene-CO2 adduct", Chem. Commun., 2003, 28-29.

F. Karadas et al., "Review on the Use of Ionic Liquids (ILs) as Alternative Fluids for CO2 Capture and Natural Gas Sweetening", Energy Fuels, 24 (2010), 5817-28.

W.D. McGhee et al., "Palladium-Catalyzed Generation of O-Allylic Urethanes and Carbonates from Amines/Alcohols, Carbon Dioxide, and Allylic Chlorides", Organometallics, 12 (1993), 1429-33.

T. Yamada et al., "Reversible, Room-Temperature Ionic Liquids. Amidinium Carbamates Dervied from Amidines and Aliphatic Primary Amines with Carbon Dioxide", Chem. Mater., 19 (2007), 967-9.

T. Yamada et al., "Reversible, Room-Temperature Chiral Ionic Liquids. Amidinium Carbamates Dervied from Amidines and Amino-Acid Esters with Carbon Dioxide", Chem. Mater., 19 (2007), 4761-8.

T. Yu et al., "Carbon Dioxide and Molecular Nitrogen as Switches between Ionic and Uncharged Room-Temperature Liquids Comprised of Amidines and Chiral Amino Alcohols", Chem Mater., 20 (2008), 5337-44.

E.R. Perez et al., "Activation of Carbon Dioxide by Bicyclic Amidines", J. Org. Chem., 69 (2004), 8005-11.

A.R. Katritzky et al., "The N-Carboxylic Acids of Nitrogen Heterocycles", Heterocycles, 26 (1987), 1333-44.

\* cited by examiner

13C/1H NMR spectra before (top) and after (bottom) carboxylation of ~1:1 ethoxyamine:tetramethylguanidine Vapor-Liquid Equilibrium of EEA/TMG with $CO_2$ (Example 4).

HIGH $CO_2$ TO AMINE ADSORPTION CAPACITY $CO_2$ SCRUBBING PROCESSES

CROSS-REFERENCE TO RELATED APPLICATIONS

This application claims the benefit of U.S. Provisional Application Nos. 61/420,960 filed Dec. 8, 2010, 61/420,978 filed Dec. 8, 2010, 61/421,048 filed Dec. 8, 2010, 61/381,281 filed Sep. 9, 2010, 61/381,294 filed Sep. 9, 2010, 61/381,351 filed Sep. 9, 2010, the entire contents of each of which are hereby incorporated by reference herein

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using a combination of basic amine(s) in the presence of a stronger non-nucleophilic base as the sorbent.

BACKGROUND

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents. Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. In addition, the low molecular weight amines commonly used in the liquid process suffer significant amine loss due to vaporization in the temperature swing process. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically, the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210-345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known, and, while they may avoid many of the limitations of amine scrubbing, solid chemical sorbents are generally challenged by poor mass and heat transfer properties, whereas solid physical sorbents suffer from a lack of sufficiently selective $CO_2$ absorption under the humid conditions present in most commercial combustion flue gas processes.

In the design of a practical $CO_2$ capture process, a number of issues need to be considered, including:
(i) The efficiency of the capture process in terms of relative amount of absorbent required,
(ii) The efficiency of the capture process in terms of energy required for absorption/desorption, and
(iii) Corrosion factors.

These issues are, of course, directly affected by the chemistry of the sorption process. The efficiency of chemisorption processes such as the conventional amine scrubbing processes is dependent in part by the ability of the absorbent medium to react with the CO2. In conventional aqueous amine systems, the process by which $CO_2$ is absorbed by amines is believed to proceed by the gaseous $CO_2$ dissolving in water to form $H_2CO_3$, which is neutralized by the amine to form an ammonium bicarbonate. Depending on pH, the ammonium bicarbonate may then react with a second mole of amine to form an ammonium carbonate. Primary and secondary amines may also react directly with the $CO_2$ to form an ammonium carbamate which is itself stable in the presence of water and may be present as a significant reaction product, especially at high amine concentration. Further reaction of the carbamate with water may lead to a final bicarbonate product with a 1:1 $CO_2$:amine ratio, or to a carbonate product with a 1:2 $CO_2$:amine ratio (depending on solution pH). Thus, the conventional amine processes are limited to a sorption efficiency which in principle, has a maximum $CO_2$:amine ratio of 1:1. Further improvements in the capture ratio and thus the efficiencies and scaleabilities of related processes are desirable.

SUMMARY OF THE INVENTION

We have now found that it is possible to enhance $CO_2$ uptake efficiencies by using sorbents containing a primary amino group, e.g., a primary amine, alkanolamine, etc., in combination with a strong, non-nucleophilic base as a second reaction component; products from the chemical reaction between the $CO_2$ and the amine/base combination have been shown to achieve $CO_2$ capture ratios greater than 1:1 on a molar basis ($CO_2$ per primary amine group). These products may be decomposed by thermal treatment or by $CO_2$ partial pressure decrease to liberate the $CO_2$ and to regenerate the liquid sorbent suitable for acid gas scrubbing operations.

According to the present invention, a $CO_2$ amine scrubbing process uses a combination of a primary amine $CO_2$ sorbent with a second, non-nucleophilic base which is more strongly basic, in terms of pKa, than the amine(s). The weaker amine base(s) are nucleophilic and have the ability to react directly with the $CO_2$ in the gas stream while the relatively stronger bases act as non-nucleophilic promoters for the reaction between the $CO_2$ and the weaker base to form a mixed ammonium carbamate reaction product in which moieties from both bases are present. The use of the mixed base combination enables the $CO_2$ uptake to be increased to a significant degree, with the $CO_2$ uptake being at least 1:1 (molar, $CO_2$ per amine group of the primary amine) and higher, potentially up to a theoretical limit of 2:1.

The process will normally be operated in a cyclic manner with the liquid absorbent circulating between a sorption zone, typically a sorption tower, and a regeneration zone, again typically in the form of a tower. The process comprises:
(i) contacting the gas stream in a sorption zone with a liquid absorbent comprising a primary aliphatic amine $CO_2$ sorbent and a non-nucleophilic base having a pKa higher than that of the amine to sorb $CO_2$ by chemisorption in the amine at a $CO_2$:amine ratio (molar, $CO_2$ per amine group of the primary amine) of at least 1:1 by reaction of two moles of $CO_2$ on at least some of the primary amine groups of the amine sorbent;
(ii) passing the liquid absorbent containing the sorbed $CO_2$ to a desorption zone to liberate $CO_2$ from the $CO_2$-containing absorbent liquid and regenerate the absorbent liquid by treating the absorbent containing the sorbed $CO_2$ under conditions sufficient to cause desorption of at least a portion of the $CO_2$, from the absorbent, and
(iii) returning the absorbent liquid from which the $CO_2$ has been liberated to the sorption zone.

Analysis has shown that the mechanism for the increased $CO_2$ uptake involves the formation of dicarboxylated products by the reaction of two $CO_2$ molecules with the primary amine groups in the amine sorbent to form dicarbamate anion moieties. The strong base is believed to promote and possibly stabilize the doubly carboxylated product in this role, permits the use as sorbents of relatively weaker bases which have generally been considered less effective for $CO_2$ scrubbing processes.

DETAILED DESCRIPTION

The methods of this disclosure involve removing $CO_2$ and/or other acid gases, such as $H_2S$, from a gas stream containing one or more of these gases using a liquid sorbent medium comprising a combination of at least two bases of differing relative basicities. One basic component can comprise one or more relatively weak amines (and/or polyamines), and the second basic component can comprise one or more relatively stronger, non-nucleophilic nitrogenous bases. The stronger base component may itself be effective to sorb $CO_2$, and it can therefore be regarded as a co-sorbent and/or as a promoter for the amine component. One way of carrying out the sorption process can be to operate with a liquid sorption medium comprising the amine and the secondary base with or without a solvent. In this variant, the process can be generally carried out in a sorption zone, typically a sorption tower in a cyclically operating unit, under absorption conditions (i.e., temperature and/or pressure) favorable for absorbing a component of the gas mixture and for producing an absorption effluent having a reduced concentration of the absorbed component relative to the gas mixture Subsequently, the sorbed component can then be desorbed from the liquid sorbent, suitably by decreasing the pressure and/or by stripping with a non-reactive gas, e.g., a natural gas stream, in a regeneration tower under conditions favoring release of the sorbed acid gas, normally increased temperature or decreased pressure. Under the selected desorption conditions, the sorbed component can be purged from the selective absorbent and recovered, sent to utilization, and/or sequestered.

Cyclic Sorption Unit

Figure 1:
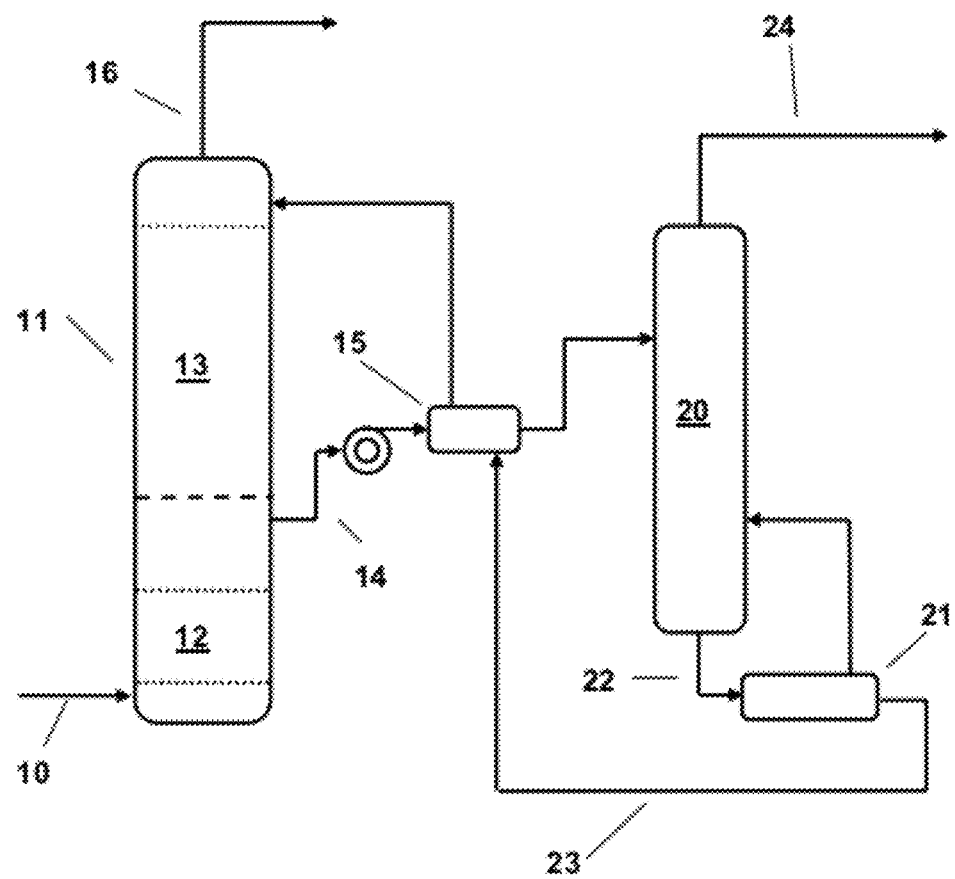
FIG. 1 is a simplified schematic of a cyclic separation unit suitable for separating $CO_2$ from a flue gas stream.

FIG. 1 shows a representative simplified schematic of a continuous cyclic gas separation unit which may be used for separating $CO_2$ from flue gas streams, natural gas streams, and other streams using the present non-aqueous solvent amine absorbent solutions. The hot flue gas stream can enter the unit by way of line 10, entering near the bottom of absorber tower 11 and preferably passing through a cooling section 12, in which its temperature can be reduced by direct or indirect cooling to bring it to a suitable temperature for the sorption step which follows. Such cooling may additionally or alternately be effective to reduce the water content of the stream, if desired. The present mixed base sorbent process can, however, be capable of operation at relatively high sorption temperatures with gas streams containing relatively high water contents and for this reason, the cooling step may be omitted with the gas passing directly into sorption section 13. In an alternate embodiment, the cooling of the hot flue gas stream can be achieved prior to the stream entering the absorber tower 11.

From here, the gas stream can pass into sorption section 13 in countercurrent contact with a descending stream of the liquid sorbent medium. At least part of the $CO_2$, along with other gases which are amenable to absorption in the solution, can be absorbed into the sorbent medium resulting in a "rich" solution 14 containing the sorbed $CO_2$ which can be removed with a separation tray (not shown) near the lower end of the sorption section. The rich solution can then pass through heat exchanger 15 to desorption/regeneration tower 20 in which the $CO_2$ and other gases can be desorbed, in this case, by an increase in temperature, decrease in pressure, and/or the use of a purge (stripping gas). The rich solution can enter the tower at a level appropriate to its composition and can pass downwards as dissolved gases are removed. Heat for the regeneration tower can be supplied by reboiler 21 which can circulate a slipstream of solution taken from near the bottom of the regeneration tower by way of line 22. A stream of regenerated lean solution with a lower content of $CO_2$ can be taken from the reboiler in line 23 to pass through the other side of heat exchanger 15 before re-entering absorber tower 11 for passage through the gas stream. A gas stream of decreased $CO_2$ content can pass out of absorber tower 11 through line 16, and the desorbed $CO_2$ and other acid gases removed from the original gas stream can be removed in concentrated form through line 24 and taken to final sequestration or utilization (e.g., in industrial gas and/or in enhanced oil recovery processes).

Conventional equipment can be used to perform the various functions of the cyclic scrubbing process, such as monitoring and automatically regulating the flow of gases so that it can be fully automated to run continuously in an efficient manner.

Gas Stream

The gas streams particularly amenable to treatment by the present sorption process can include flue gas from the combustion of carbonaceous fuels and/or natural gas from subterranean and other sources. Flue gas may originate from the combustion of carbon-containing fossil fuels such as natural gas, oils, and/or lignite, as well as sub-bituminous, bituminous, and/or anthracite coals. Its $CO_2$ content may typically vary from about 6 to about 15 weight percent, depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, neon, argon, krypton, hydrogen sulfide, and carbonyl sulfide, as well as, in some cases, mercury and/or other metal contaminants, if they have not been removed by other pre-treatment. Other streams that can be treated by the present separation process can include syngas and shifted syngas produced in fuel gasification processes and gas streams from petrochemical plants whose composition can naturally depend on the process from which they are derived.

The amount of carbon dioxide in the gas mixture can typically vary from about at least 1 percent upwards; in many streams, it can be at least 10 percent and may even be higher, as with some gas streams from natural gas fields such as the LaBarge (Wyoming) field, where the gas is about 66.5 percent carbon dioxide, about 20.5 percent methane, about 7.4 percent nitrogen, about 5.0 percent hydrogen sulfide, and about 0.6 percent helium.

Water is likely to be present both in flue gases and in natural gas from combustion of hydrocarbon fuels or from contact with ground waters. Although the present process can accept water in the entering gas stream, removal of substantial quantities may be desirable. In such situations, the gas stream may optionally also be subjected to dehumidification prior to contacting with the absorbent materials and processes described herein. The dehumidification can be carried out by conventional methods by the use of a drying agent/absorber guard bed upstream of the acid gas scrubbing unit, and/or by carrying out the $CO_2$ absorption at temperatures above 100° C. using an absorbent capable of being regenerated above the absorption temperature. For example, the dehumidification can be carried out by absorption over solid sorbents such as salt dryers, molecular sieves, silica gels, and/or aluminas.

Absorption Process

In conventional aqueous amine systems, the process by which $CO_2$ is absorbed by amines is believed to focus on Bronsted acid-base chemistry, where an essential feature can include proton transfer from a Bronsted acid to a Bronsted base. Gas phase $CO_2$ can dissolve in water forming a Bronsted acid, $H_2CO_3$, which can be neutralized by the amine Bronsted base to form an ammonium bicarbonate. Depending on pH, the ammonium bicarbonate may then react with a second mole of amine to form an ammonium carbonate. In both cases, this is purely Bronsted acid-base chemistry. Primary and secondary amines can exhibit both Lewis and Bronsted basicities in this scheme. Tertiary amines lack a proton for intramolecular transfer to form the acid intermediate, and therefore only exhibit Bronsted basicity in this chemistry. Further reaction of the carbamate with water may lead to a final bicarbonate product with a 1:1 $CO_2$:amine ($CO_2$:non-tertiary amine) ratio, or to a carbonate product with a 1:2 $CO_2$:amine ($CO_2$:non-tertiary amine) ratio (depending on solution pH). The conventional aqueous process is based on trying to control adsorption/desorption conditions to enhance fast carbamate formation while minimizing the formation of bicarbonates.

In non-aqueous systems, a zwitterion can form by nucleophilic attack of the lone pair of electrons on the nitrogen of the amine onto the carbon of the $CO_2$. Again, the zwitterion is usually unstable and can rapidly rearrange via proton transfer to the corresponding carbamic acid. Both the zwitterions and the carbamic acids can generally be unstable, and it is not known which equilibrium form undergoes further reaction, although it is posited that the $CO_2$ carbamic acid may be deprotonated by a second equivalent of free amine to produce an ammonium carbamate salt with the overall stoichiometric requirement of two moles of amine per one mole of carbon dioxide absorbed (0.5:1 $CO_2$:non-tertiary amine). This pathway can also be found in aqueous systems at early reaction stages, although there may be a different carbamate-carbamic acid equilibrium in non-aqueous systems, and, in the aqueous systems, there exists the possibility of further reaction with water to form bicarbonate and carbonate.

tures not more than about 10° C. (about 18° F.), e.g., not more than about 20° C. (about 36° F.), higher—in certain cases, it may even carried out substantially isothermally. With sorption temperatures above about 50° C., the $CO_2$ may be effectively desorbed by raising the temperature of the solution containing the sorbed $CO_2$ to about 70° C. or higher, for example, and, if the gas stream entering the process contains significant amounts of water, the desorption temperature may be raised to about 100° C. (about 212° F.) or higher, for example, to desorb water which enters the sorbent solution; the desorption temperature need not, however, be higher than about 120° C. (about 248° F.), since the $CO_2$ can typically be desorbed with a minimal temperature increase, and, as long as ~100° C. or thereabouts is attained, any sorbed water should typically be effectively driven out of the sorbent solution,

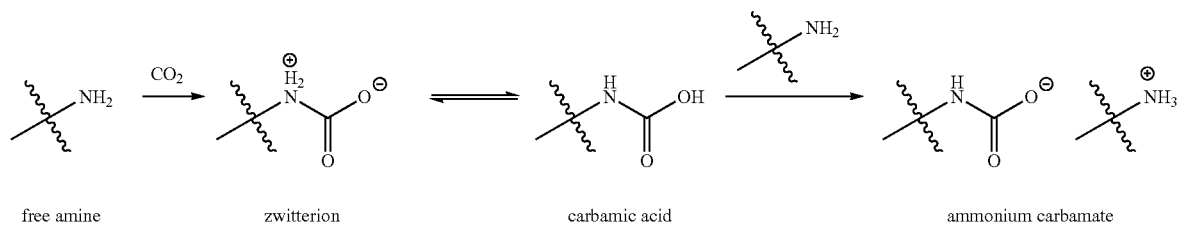

free amine      zwitterion      carbamic acid      ammonium carbamate

This chemistry requires the amine to function as both an effective nucleophile (Lewis base) in its attack on the $CO_2$ and a proton acceptor (Bronsted base) in its reaction with the carbamic acid. These two types of basicity are, however, different, in that Lewis acid-base reactions involve electron transfer, while Bronsted acid-base reactions involve proton transfer. A strong Bronsted base may not necessarily be a strong Lewis base, and vice versa. Both the internal proton transfer to form the carbamic acid and the subsequent acid-base reaction to form the carbamate product would be expected to be rapid. The initial nucleophilic addition of the amine nitrogen and $CO_2$ carbon can therefore be considered the rate-determining step in the formation of ammonium carbamate.

Mixed Bases

Since the reaction sequence posited above requires two types of amine basicity, the use of the second base in addition to the amine can provide the ability to fine-tune nucleophilicity and Bronsted basicity independently and can help improve or optimize the overall reaction kinetics and thermodynamics. In the presence of a strong Bronsted base, a strongly nucleophilic amine can tend to provide rapid overall kinetics and enhanced carbamate product stability, although it should be noted that producing a more stable carbamate may increase the regeneration energy requirement in a reversible $CO_2$ absorption/desorption process.

By suitable choice of the mixed bases, the thermodynamics and kinetics of the sorption and desorption reactions can be varied so that the sorption can be carried out at a relatively high temperature favorable to the treatment of gas streams, such as typical of flue gases. Operation of the sorption step at temperatures of at least about 50° C. (about 122° F.), e.g., at least about 70° C. (about 158° F.) or at least about 90° C. (about 194° F.), could then become feasible. Desorption may be carried out by stripping with a non-reactive gas such as nitrogen and/or natural gas, by reduction of the pressure above the sorbent solution, and/or by increase in temperature. If stripping with a non-reactive gas such as nitrogen is employed, the $CO_2$ may typically be desorbed at temperafitting it to be recycled to the regeneration step after cooling to the correct sorption temperature.

Using mixed base pairs comprising a strong nucleophile combined with a strong (Bronsted) base (non-nucleophilic, normally nitrogenous base), a mixed ammonium carbamate salt can be formed in which the nucleophilic amine nitrogen can form the covalent bond with $CO_2$, while the second base can accept the proton from the nucleophilic amine to form the ammonium counter-cation, as shown below.

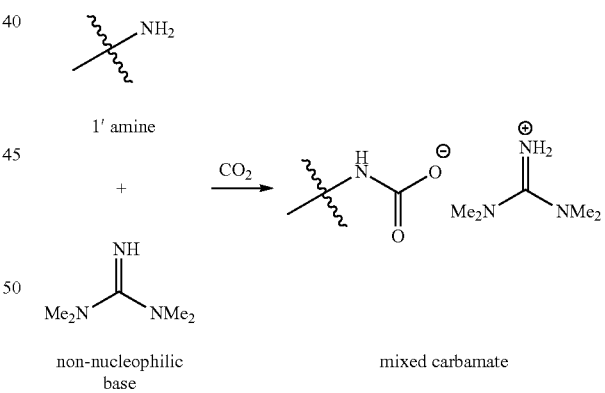

1' amine non-nucleophilic base mixed carbamate

While primary and secondary amines can form the carbamic acid/carbamate species in both aqueous and non-aqueous systems, tertiary amines are typically unable to do so in non-aqueous systems, lacking the necessary proton for the transformation of the zwitterion to the carbamic acid. They can therefore generally be unable to form a stable product with $CO_2$ in non-aqueous solution. They can, however, be capable of functioning as a proton-accepting species, e.g., as the non-nucleophilic Bronsted base component of the mixed base system, in the presence of more weakly basic nucleophilic species in non-aqueous solution, as shown below.

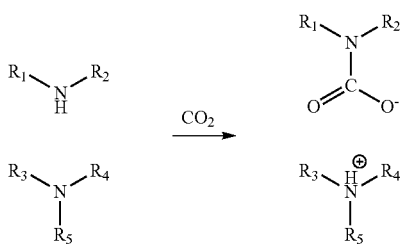

In the presence of water, hydration may lead to the formation of ammonium carbonate and/or bicarbonate species with $CO_2$ via hydrolysis of the carbamate, or the direct addition of water to $CO_2$ plus proton transfer; tertiary amines, functioning as Bronsted bases, may also form bicarbonate as a stable product by reaction with water and $CO_2$. The aqueous $CO_2$ reaction to form bicarbonate with either kind of base (tertiary amine or Lewis base) is typically slower than carbamate formation and can be inhibited, e.g., by selecting the appropriate pair of bases to generate a very stable mixed carbamate and so increase the selectivity of $CO_2$ absorption by the bases over other reactive compounds, primarily water. Thus, by use of a suitable mixed base pair, the potential exists for selectively reacting $CO_2$ in an aqueous solution and/or from a wet gas source, eliminating the need to dry the gas in order to achieve carbamate-only reaction chemistry.

Double Carboxylation

The present process is based on a functional separation between the Lewis and Brønsted acid-base reactions; this can enable a novel chemical reaction sequence to take place in which two moles of $CO_2$ can be taken up by primary amine groups to form ammonium dicarbamates. This permits, in theory, a $CO_2$:amine uptake ratio of ~2:1 (molar, $CO_2$: amine group) to be achieved. The functional separation can be achieved by the use of a primary, nucleophilic amine conceived hypothetically to function initially as the Lewis base in the reaction with the $CO_2$; a non-nucleophilic base providing the Brønsted base function can then form an ammonium carbamate by reaction with the carbamic acid/Zwitterion intermediate. The mixed base carbamate is then believed to react with an additional $CO_2$ molecule by repeated nucleophilic attack in a similar manner to form a final hypothesized reaction product comprising mixed dicarbamate and/or carbamic acid salts.

The products formed by dicarboxylation can be either dicarbamate, dicarbamic acid salts or diacids as shown by the equations below.

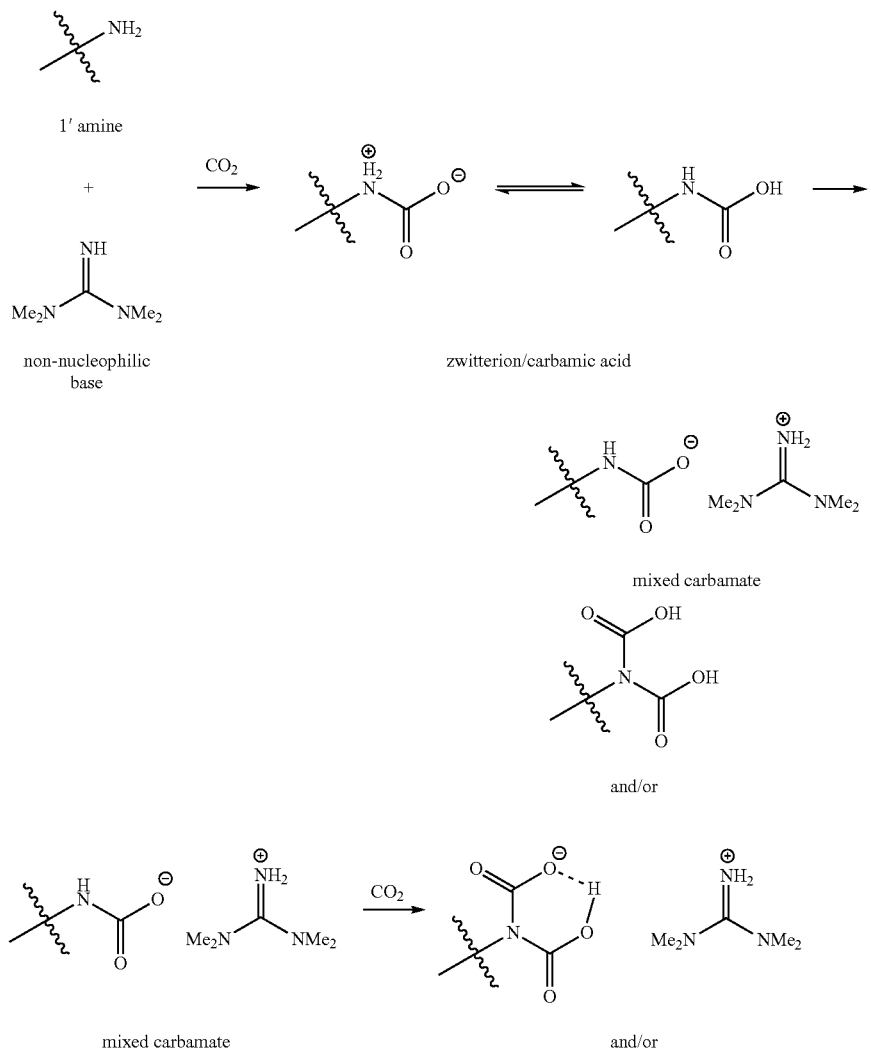

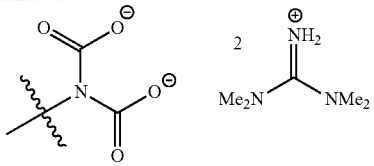

mixed dicarbamate/
carbamic acid(s) and salts

As can be seen, the presence of the two protons on the primary amine weak base can enable this reaction to proceed with the final reaction product having two moles of $CO_2$ incorporated at each primary amine site. The actual product mixture present may be a mixture of monocarboxylated (carbamate) and dicarboxylated (dicarbamate) products; furthermore, each of these products may be present in a mixture of (di)carbamate (ion pair) and (di)carbamic acid (neutral) forms, with the balance of this mixture influenced by the ratio of amine to strong base used. The strong base can facilitate formation of the double carboxylation products by more efficiently binding the proton transferred from the zwitterion/carbamic acid intermediate formed by the initial nucleophilic attack of the nitrogen lone pair onto the $CO_2$. These doubly carboxylated products can be relatively less stable than the corresponding monocarboxylated analogs and can readily be decomposed to release the $CO_2$ at moderate temperatures, typically below ~100° C. and usually below ~80° C., whereas the monocarboxylated forms stabilized by the strong base can show higher stability. The dicarboxylated products may further show two-stage decomposition behavior (relatively facile desorption back to monocarbamate, then less facile desorption to pure amine/non-nucleophilic base). This can present additional advantages for tailoring the energetics and kinetics of an acid gas scrubbing process. Desorption of $CO_2$ from certain doubly carboxylated products by non-reactive gas (nitrogen) stripping has been observed at ambient temperatures (~20-30° C.) used for the sorption, indicating the possibility of an isothermal sorption-desorption process in which the sorbent medium is regenerated by gas stripping at ambient temperature with a significant energy saving over the processes requiring a temperature increase for the desorption step. The Examples demonstrate the stability and the desorption kinetics of the compounds formed by the sorption of the $CO_2$ and show that desorption can be effectuated by applying a $N_2$ purge through the $CO_2$-saturated solutions at room temperature.

As shown earlier, two competing reaction schemes are accessible to a stoichiometric mixture of a primary (highly nucleophilic) amine and a non-nucleophilic base (possibly an amine, but more commonly an imine or heterocyclic amine). Upon $CO_2$ addition, the primary (nucleophilic) amine can attack the C=O group of $CO_2$ to form a zwitterionic species in equilibrium with a carbamic acid. The zwitterion/carbamic acid can be deprotonated preferentially by the highly basic, non-nucleophilic second base, e.g., tetramethylguanidine, to form a mixed carbamate which can be less nucleophilic/basic than the starting primary amine. The driving force of the strong base to accept and keep protons can lead to attack by the carbamate onto a second $CO_2$ molecule to form diaddition products that may then also be deprotonated by the non-nucleophilic base. It can be inferred that the carboxylate-containing (carbamate) forms of the dicarboxylated products can be stabilized by some type of chelating weak interaction between the protons of the strong base (e.g., guanidinium) and the carboxylate groups. The fact that $CO_2$ molar loadings higher than ~100% (based on the second base) have been observed suggests that the dicarboxylation products may not be exclusively in a carbamate (salt) form but may possess carboxylic acid character.

The use of a primary amine can enable the capture of two moles of $CO_2$ by the amino nitrogen to be made, resulting in products with greater than ~1:1 amine group:$CO_2$ stoichiometry. The double carboxylation reaction can permit, in theory, a $CO_2$:amine group ratio of up to ~2:1 (molar, $CO_2$:primary amine group); although this may not be achieved in practical operation, the extent of dicarboxylation which does take place can result in increased $CO_2$ molar sorption relative to the amount of amine sorbent. The doubly carboxylated reaction products may be decomposed thermally and/or by $CO_2$ partial pressure drop to provide a highly efficient liquid sorbent suitable for acid gas scrubbing applications.

Weak Bases

The liquid sorbent medium can contain one or more nucleophilic amines, i.e., amines having a potentially nucleophilic nitrogen, to provide the Lewis base function for reaction with the $CO_2$. The weakly basic nucleophilic amines can preferably include primary amines capable of participating in the initial formation of the zwitterion by nucleophilic attack onto the carbon of the $CO_2$ (and its subsequent transformation into the carbamic acid). In general terms, the primary amine component can be classified as being less basic in terms of its $pK_a$ (acid dissociation equilibrium constant) than the non-nucleophilic base used as the second component. A relatively strongly basic primary amine can be preferred in certain embodiments, however, in order to maintain high levels of basicity in the medium after the first reaction and facilitate the progress of the second reaction; a higher dicarboxylation yield may therefore be expected with a relatively strong primary amine component. These amines can advantageously have a $pK_a$ (acid dissociation equilibrium constant) of at least 5; although values below 5 may be potentially useful where low temperature regeneration is desired. may lead to the formation of carbamates which can be regenerated at lower temperatures, their utility for the formation of the dicarboxylated products can be lower than those having $pK_a$ values in the preferred range above 5 ($pK_a$ as measured/predicted at 25° C. in aqueous solution and/or as measured in other solvent and converted to an aqueous value, referred to as aqueous equivalent scale). Additionally or alternately, the primary amines can have a $pK_a$ of not more than about 11, although, in most cases, the $pK_a$ of the amine can typically be from about 8 to about 11, from about 8 to about 10, or from about 8 to about 9. The sorbent may additionally contain a secondary amine as an added sorbent, although these secondary amines lack the ability to form the double carboxylated reaction product, since they have only one proton on the amino nitrogen which can undergo reaction with the $CO_2$. Substituted and unsubstituted primary amines may be used with substituent groups such as alkyl (usually lower $C_1$-$C_6$ alkyl), hydroxyalkyl (usually lower $C_1$-$C_6$ hydroxyalkyl), hydroxyl, alkoxy (usually lower $C_1$-$C_6$ alkoxy), aryl, and nitrile, being the most common. Aryl substituents are preferably not present but, if present at all, should typically be positioned no closer than the beta carbon of the alkyl chain in order to maintain the aliphatic character of the amine by precluding delocalization of the lone pair on the amine nitrogen into the aromatic ring system. On the other hand, the presence of polar and/or electronegative substituents, such as nitrile, hydroxyl, etc., and/or of electronegative atoms and groups, especially oxygen, in the backbone chain of the amine, as in the etheramines, is believed to be favorable for interaction with the solvent, e.g., so as to avoid the formation of precipitates in otherwise soluble systems. Oxygen and other linking species may be in the chain, such as in 2-ethoxyethylamine (2EEA or EEA).

Primary amines which may be used as the nucleophilic amine can include 3 aminopropionitrile (APN), aminoacetonitrile, alkanolamines (such as monoethanolamine (MEA), 2-amino-2-methyl-1-propanol (AMP), 2-(2-aminoethylamino)ethanol (AEE), 1,5-diamino-3-oxapentane (DAOP, also called 2,2'-oxybis(ethylamine)), and/or 2-amino-2-hydroxymethyl-1,3-propanediol (Tris)), or the like, or combinations thereof. Additionally or alternately, other potentially useful amines in this role can include, for example, diglycolamine (DGA), 2-n-propoxyethylamine, bis(2-methoxyethyl)amine, bis(2-ethoxyethyl)amine, 3,3'-iminodipropionitrile, and/or hydroxyethyl-ethylenediamine (HEEDA). Although some amines such as isopropylamine ($pK_a$ 10.7) are relatively basic, they may perform in the role of the weakly basic amine when used in combination with a base such as 1,1,3,3-tetramethylguanidine (TMG, predicted $pK_a$ ~15.2) which is relatively more basic. Tertiary amines alone are typically not used for this component of the sorbent, in view of their substantial inability to engage in the nucleophilic reaction with the $CO_2$ to proceed to the carbamic acid in the absence of water.

The role of the weakly basic amine can additionally or alternately be provided by a polyamine. One such class of polyamines can include polyalkyleneimines that are linear, cyclic, and/or branched (including dendritic/hyperbranched), and that contain one or more secondary amines, optionally one or more primary amines, and optionally one or more tertiary amines. Due to structural and/or electronic differences, these polyamines would be expected to have a range of base strengths. It should be readily apparent that the potential of generating a relatively high charge density by extensive reaction with $CO_2$ could result in the formation of a dense network of such molecules, when used in combination with a more strongly basic, non-nucleophilic amine.

Non-limiting examples of such polyalkyleneimines can have a general repeat unit structure of $-[(CH_2)_x-NR]_y-$, where x is from 2 to 6, where y is from 4 to 50, and where each R is hydrogen (representing the situation where the backbone nitrogen is a secondary amine), an alkyleneamine branch having the structure $-(CH_2)_x-NH_2$ (representing the situation where the backbone nitrogen is a tertiary amine and where the resulting branch nitrogen is a primary amine), or an alkyleneimine branch having the structure $-(CH_2)_x-NR'_2$, where a first R' is an alkyleneamine branch or another alkyleneimine branch and a second R' is hydrogen (representing the situation where the backbone nitrogen is a tertiary amine and where the resulting branch nitrogen is a secondary amine), another alkyleneimine branch (representing the situation where the backbone nitrogen is a tertiary amine and where the resulting branch nitrogen is a tertiary amine, with the further branch nitrogen being a secondary or tertiary amine), or yet another alkyleneamine branch (also representing the situation where the backbone nitrogen is a tertiary amine and where the resulting branch nitrogen is a tertiary amine, with the further branch nitrogen being a primary amine). It should be understood herein that the subscript "y" represents the average number of repeat units in a linear polyalkyleneimine chain and thus is only meaningful as an average number; it is contemplated that the distribution of polymeric/oligomeric polyalkyleneimines can reflect some proportion of chains having higher or lower backbone/linear repeat units without significantly departing from the scope of the recited "y" range(s) herein. Polyalkyleneimine polymers/oligomers useful according to the invention can be purchased and/or prepared by conventional methods known in the art.

The polyalkyleneimines useful in the methods according to the invention can exhibit only primary and secondary amines (e.g., typically unbranched, linear or cyclic), only primary and tertiary amines (highly uncommon), or primary and secondary and tertiary amines (e.g., typically branched or cyclic). In such cases where only primary and secondary amines are present, the average molar ratio of primary amines to secondary amines can range from about 2:1 to about 1:40, for example from about 2:1 to about 1:20, from about 2:1 to about 1:15, from about 1:1 to about 1:40, from about 1:1 to about 1:20, from about 1:1 to about 1:15, or from about 1:1 to about 1:10. In such cases where primary, secondary, and tertiary amines are all present, at least one or more of the following can advantageously apply: the average molar ratio of primary amines to secondary amines can range from about 5:1 to about 1:50, for example from about 5:1 to about 1:30, from about 5:1 to about 1:15, from about 3:1 to about 1:30, from about 3:1 to about 1:15, or from about 3:1 to about 1:10; the average molar ratio of secondary amines to tertiary amines can range from about 15:1 to about 1:10, for example from about 10:1 to about 1:5; and the average molar ratio of primary amines to tertiary amines can range from about 10:1 to about 1:50, for example from about 10:1 to about 1:30, from about 10:1 to about 1:20, from about 10:1 to about 1:10, from about 5:1 to about 1:10, from about 5:1 to about 1:30, from about 5:1 to about 1:20, or from about 5:1 to about 1:10.

One potentially favorable economic aspect of the present non-aqueous process is that it can enable less costly, weakly basic amines such as aniline (predicted $pK_a$ ~4.6) to achieve effective capture of the $CO_2$. Product stoichiometry, loading, and/or absorption/desorption kinetics may be further manipulated advantageously by varying the structure of the amines used (e.g., by attaching electron-withdrawing and/or donating groups) to provide different inherent basicities ($pK_b$'s) and/or steric properties. A useful means of making an adequate prediction of the $pK_a$ value of the amine can be the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C₁T4. Exemplary $pK_a$ values for a limited number of compounds are given in the Bordwell online $pK_a$ database, http://www.chem.wisc.edu/areas/reich/pkatable/index.htm.

Strong Base

In addition to the primary amine(s), the sorbent medium can also contain one or more non-nucleophilic compounds which can provide the Bronsted base function in the reaction to form the carbamate. This class of bases can be represented generally as non-nucleophilic and having a $pK_a$ as measured and/or predicted at ~25° C. in aqueous solution (or as measured in other solvent and converted to an aqueous value, referred to as aqueous equivalent scale) higher than that of the nucleophilic amine, which pKa can be at least 8.5, e.g., at least 9.0, at least 10.0, at least 12.0, or at least 13.0 (which values indicate progressively more stable carbamate formation). The ACD/PhysChem Suite may be used for making a prediction of the $pK_a$ value of the base in many cases.

The strong base, typically a nitrogenous base, can advantageously be basic enough to influence the equilibrium towards the carbamate effectively, but on the other hand, not necessarily so strong as to stabilize the carbamate to the point that the effect becomes irreversible/too difficult, and thus to the point that desorption of the $CO_2$ becomes difficult/infeasible, e.g., by an inconveniently high temperature requirement. Bases which are not acceptable are those that may undesirably influence the reaction chemistry of $CO_2$ (e.g., including but not limited to hydroxide bases that form water upon protonation). The base can preferably additionally lack the propensity to act as a competing nucleophile towards $CO_2$ under the conditions of the sorption process, although some degree of nucleophilicity may be tolerated.

Non-nucleophilic nitrogenous bases useful for promoting the carboxylation reaction with the ionic liquid sorbents can include cyclic, multicyclic, and acyclic structures, such as imines, heterocyclic imines and amines, amidines (carboxamidines), including the N,N-di(lower alkyl) carboxamidines (e.g., lower alkyl preferably being $C_1$-$C_6$ alkyl), N-methyltetrahydropyrimidine, 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), guanidines, including substituted guanidines of the formula $(R^1R^2N)(R^3R^4N)C=N-R^5$ where $R^1$, $R^2$, $R^3$, and $R^4$ are preferably lower alkyl (e.g., $C_1$-$C_6$) and $R^5$ is preferably H, such as 1,1,3,3-tetramethylguanidine, and combinations thereof. Additionally or alternately, other substituents, such as higher alkyl, cycloalkyl, aryl, alkenyl, and substituted alkyl as defined previously, and other structures may be used. These strong nitrogenous bases can typically be used on a ~2:1 molar equivalent basis with each amine group of the weak amine in order to form the desired dicarboxylated product, although they may be present or used in molar excess if they are capable of reacting with the $CO_2$ alone; the use of less than two moles of the strong base per amine group can be possible but not preferred because it can tend to reduce the $CO_2$ sorption capacity of the system correspondingly, e.g., by limiting the ability to form the dicarboxylated moiety at each of the available amino groups.

A relatively strong non-nucleophilic base can be preferable, e.g., to promote the first and, especially the second, carboxylation reaction. At the same time, a relatively strong primary amine can be preferable, e.g., to keep high basicity after the first reaction and/or to facilitate the progress of the second reaction so that a higher dicarboxylation yield may be expected with a relatively strong amine and a relatively strong base. A balancing of basicity values may enable the service requirements, for example, the temperature at which the sorption/desorption steps can be varied, such as in accordance with the temperature of the incoming gas steam, e.g., flue gas at a relatively high temperature. A base such as n-butylamine (pKa ~10.7) can be used better in combination with a base such as TMG (pKa ~15.2) rather than a base with a pKa only slightly higher, such as 1,5-dimethylhexylamine (pKa ~11.04). A difference of at least 3, for example at least 5 or at least 6, can be preferred in some embodiments.

Since a wide range of bases may be used in the present process with their basicities (as measured by their respective $pK_a$ values) extending over a wide range, certain bases, typically with intermediate $pK_a$ values, may act as a weak base in certain combinations and as a strong base in others. 1,5-diamino-3-oxapentane (DAOP, predicted $pK_a$ ~9.07) and/or 1,5-bis(methylamino)-3-oxapentane (BMAOP, predicted $pK_a$ ~9.87), for example, may be used as strong bases with weakly basic amines such as aniline, or may alternately function as weak bases in combination with the stronger bases like an amidine and/or guanidine, such as TMG ($pK_a$ ~15.2). The suitability of various bases for use in combination with each other may be selected on a continuum relating their electron-donating (Lewis base) and proton-accepting (Bronsted base) characteristics. While a distinction in hypothetical terms between weak bases at strong bases can be set at $pK_a$ ~7, various combinations not adhering to this arbitrary distinction are available. The selected mid-point of $pK_a$ ~7 is the center of the aqueous pH scale but is not, however, inherently significant for a non-aqueous system.

Solvent

The amine/base mixture may be used as the neat liquid sorbent material provided that it remains sufficiently liquid to be pumped and handled in the unit. In certain embodiments, for this reason, diamines and higher amines for the most part tend not to be preferred without a solvent, since gels and other viscous reaction products may be formed with the $CO_2$ due to the di-/poly-functionality of molecules and/or the potential for strong intermolecular interactions. In any event, it has been found that the solvent may enhance the capability of the sorbent to react with the $CO_2$ at desirable $CO_2$:amine adsorption ratios, especially when dicarboxylation of a primary amine is a particular objective. The use of the solvent can enable the viscosity of the sorbent medium to be controlled to maintain pumpability, so that it may be circulated readily in the unit and/or so that the concentration of the amine/base in the solvent may be adjusted to maintain the desired solution viscosity as needed, particularly for the rich solution containing the sorbed $CO_2$.

The solvent is typically a polar solvent with aprotic solvents and particularly, the non-aqueous aprotic solvents, being preferred. Polar non-aqueous solvents may be effective to stabilize the products by facilitating the proton transfer to form the carbamate. A polar solvent can also increase physical absorption of the $CO_2$, to increase the concentration of $CO_2$ in solution, thereby facilitating increased loading and capacity of the absorbent. Corrosivity is also expected to be reduced in a non-aqueous system enabling the use of cheaper metallurgies, e.g., carbon steel, with reduced concern about corrosion at higher loadings. In addition to being non-aqueous, polar and aprotic, the preferred solvents preferably have a boiling point of at least 65° C. and preferably 70° C. or higher in order to reduce solvent losses in the process and higher boiling points are desirable depending on the regeneration conditions which are to be used. If the regeneration is to be carried out at a temperature above 100° C., e.g., if so required for the desorption or to remove any water entering the system in the gas stream, a boiling point above 100° C., preferably above 150° C. or even higher, is required. Use of higher boiling point solvents will conserve valuable energy which would otherwise be consumed in vaporization of the solvent.

Solvents found effective to various extents can include toluene, sulfolane (tetramethylene sulfone), and dimethylsulfoxide (DMSO). Although toluene has a low dipole moment, indicating a low degree of polarity, it is adequately polar for use in the present process as shown by experiment. Other solvents of suitable boiling point and dipole moment could include, but are not limited to, acetonitrile, dimethylformamide (DMF), tetrahydrofuran (THF), ketones such as methyl ethyl ketone (MEK), esters such as ethyl acetate and amyl acetate, halocarbons such as 1,2-dichlororobenzene (ODCB), and combinations thereof. Dipole moments (D) and boiling points for selected solvents are:

| | Dipole Moment (D) | Boiling Point (° C.) |
|---|---|---|
| Toluene | 0.36 | 110.6 |
| Sulfolane | 4.35 | 285 |
| DMSO | 3.96 | 189 |
| DMF | 3.82 | 153 |
| MEK | 2.78 | 80 |
| Acetonitrile | 3.92 | 81 |
| THF | 1.63 | 66 |
| ODCB | 2.50 | 180.5 |

Additionally or alternately, an ionic liquid can be used/included as a solvent, notwithstanding that certain ionic liquids appear to favor the formation of carbamic acid products (which have a 1:1 amine:$CO_2$ stoichiometry) and to inhibit the formation of carbamate products (2:1 stoichiometry). The ionic liquids may themselves act as useful chemisorbents for $CO_2$ under the conditions contemplated for use in the present process and may therefore be useful in this adjunct role. Many of them are nonflammable, non-explosive, and have high thermal stability. They can also be recyclable, which can be helpful in reducing environmental concerns over their use.

A class of ionic liquids which has been found to be highly effective as solvents and/or $CO_2$ chemisorption agents can include, for example, imidazolium, benzimidazolium, imidazolidinium (4,5-dihydro-1H-imidazolium), diazolium, and thiazolium salts with a hydrogen at the 2-position. Imidazolium salts found to function well as solvents and chemisorbents for $CO_2$ include the 1,3-dialkyl substituted imidazolium salts with preference for the acetate salts (but other salts may be considered, such as those with halide, thiocyanate, or lower alkyl chain carboxylate anions), particularly those derived from the 1,3-di(lower alkyl) imidazolium cations, where lower alkyl is $C_1$-$C_6$ (preferably $C_1$-$C_4$) alkyl, as exemplified by 1-ethyl-3-methyl imidazolium acetate and 1-butyl-3-methyl imidazolium acetate.

Preferred anions for forming salts with the cations of the ionic liquid can include those in which the conjugate acid of the counterion has a $pK_a$ as measured and/or predicted at ~25° C. in aqueous solution (or as measured in other solvent and converted to an aqueous value, referred to as aqueous equivalent scale) of at least 0, for example of at least 2.0 or of at least 4.0. The anion of the ionic liquid salt can affect its ability to act as an agent for $CO_2$ capture, with more basic anions (such as acetate and/or thiocyanate) enhancing chemisorption and less basic anions (such as chloride) being ineffective and/or less effective in enhancing chemisorption. A useful means of making an adequate prediction of the $pK_a$ value of the counterion can include use of the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C₁T4. For further specificity on ionic liquids, reference can be made to the relevant portions of U.S. Patent Application No. 61/381,281, filed Sep. 9, 2010, and its corresponding non-provisional application, both of which are hereby incorporated by reference.

Once the absorbent medium has been formulated with amine/base combination and the solvent, optionally with ingredients such as antioxidants, corrosion inhibitors, and the like, it can be employed, for example, in an absorption unit, as illustrated in outline in FIG. 1.

The concentration of the amine, base, and solvent (if present) can vary over a wide range, e.g., from 5 to 90 wt %, from 10 to 90 wt %, from about 10 to about 50 wt %, or from about 10 to about 30 wt %, for the amine/base combo in solvent. Since the sorption temperature and $pK_a$ of the amine and strong base may also play into the reaction equilibrium, the optimal (or merely a desirable) concentration may be determined empirically taking this into account, along with sorbent viscosity and/or other factors.

The formation of precipitates in these methods is generally regarded as undesirable, since, if precipitates are formed, the concentration of the active amine sorbent in solution decreases and the amount of amine available for $CO_2$ capture decreases accordingly. For this reason, the use of amines with electronegative/polar substituents can potentially be favorable.

Solid Phase Operation

While the present process can be suited to operation in the liquid phase, the same chemistry can alternately be conducted in the pores or on the surface of a porous, solid support. This may involve impregnating a solution of the amine component and the non-nucleophilic strong base into a porous support, depositing the amine component and the non-nucleophilic strong base (e.g., via solution) onto a porous support, and/or chemically grafting one or both of the amine and strong base onto the surface of the support by chemical reaction between the support material and the amine and/or base. Additionally or alternately, a precursor of the amine and/or base may be used and/or a reactive compound containing the amine/base groups required for participation in the carboxylation reaction. Common support materials can include carbon (activated charcoal), as well as porous solid oxides of metals and metalloids and mixed oxides, including but not limited to alumina, silica, silica-alumina, magnesia, titania, and zeolites, inter alia. Porous solid polymeric materials can additionally or alternately be suitable, provided that they are sufficiently resistant to the environment in which the sorption reaction is conducted. Regeneration, in this case, could be achieved by operating in a temperature swing sorption mode by heating the solid containing the sorbed $CO_2$ to decompose the $CO_2$/amine/base reaction products (dicarboxylate/carbamate/carbamic acid) on the support surface to release the sorbed $CO_2$. Heating can conveniently be accomplished by passing a heated gas stream through a bed of solid sorbent, e.g., in a countercurrent direction to that of the initial gas stream; the purge gas may be supplied using a slipstream from the purified gas stream. In this way, energy savings may be achieved by avoiding the necessity of heating large volumes of solution.

As the components of the gas stream tend to have relatively small molecular dimensions, the minimum pore size of the support may not, in itself, be a severely limiting factor, but, when the basic nitrogenous compounds are impregnated, the entrances to the pore systems of small and intermediate pore size zeolites may become occluded by bulky amine/base component(s) and, for this reason, may not be preferred with the amines and bases of relatively larger molecular dimensions. In order to minimize diffusion limitations, especially with bulky amine and/or base components, the preferred porous solid support materials can have relatively large pore sizes, with mesoporous and macroporous materials, as well as large pore zeolites, being particularly suitable. Amorphous porous solids with a range of different pore sizes are likely to be suitable, since at least some of the pores should have openings large enough to accept the basic component(s) and then to leave sufficient access to the components of the gas stream. Supports containing highly acidic reaction sites, as with the more highly active zeolites, are more likely to be more susceptible to fouling reactions upon reaction with the nitrogenous compound than less acidic species are therefore less likely to be preferred.

A preferred class of \mesoporous/macroporous materials (as defined by IUPAC) can include the silica compounds of the M41S series, including MCM-41 (hexagonal), MCM-48 (cubic), and other mesoporous materials such as SBA-15.

Sorption/Desorption Conditions

For absorption processes herein, the temperature can typically be in the range from about 20° C. to about 90° C., for example from about 25° C. to about 75° C., from about 50° C. to about 70° C., or from about 50° C. to about 90° C., with greater sorption typically achieved at lower temperatures within these ranges. In most cases, therefore, a maximum temperature for the sorption can be about 80° C. (or alternately about 70° C.). Although some mixed base (amine plus second base function) systems have been found to possess the capability to sorb $CO_2$ effectively at the latter two temperature ranges, the stability of the double carboxylated reaction products can normally tend to favor operation of the sorption portion of the cycle at relatively low temperatures. Thus, the use of lower sorption temperatures, e.g., from about 15° C. to about 70° C., from about 15° C. to about 50° C., from about 20° C. to about 50° C., or from about 20° C. to about 30° C., can be preferred.

The desorption step to regenerate the sorbent medium may be carried out isothermally or near isothermally with the sorption by stripping with a non-reactive gas for example, at a temperature not more than 30° C. higher than the sorption temperature; when a particularly favorable amine/base combination is used, it may be possible to attain a sorption/desorption temperature differential of no more than 20° C., or even no more than 10° C. Typically, however, desorption can be favored by an increase in the temperature of the solution with desorption being faster with greater temperature differentials. In situations where water is present in the stream to be processed, regeneration may need to be performed at a temperature sufficient to remove the water and prevent build-up in the scrubbing loop. In such a situation, the $CO_2$ may be removed at pressures below atmospheric pressure, but above 100° C. For example, the regeneration temperature may be around 90° C., but, to remove any water in the sorbent, temperatures in the range from 100° C. to 120° C. may be required. While this can be less favorable energetically than desorption at temperatures below 100° C., it can compare favorably to significantly higher temperatures of 140° C. to 175° C. and higher used in conventional aqueous systems, where the additional energy required for desorption has imposed substantial operating costs.

When these factors are taken into consideration the temperature selected for the desorption temperature can be about 120° C. or less, and successful desorption may be achievable at temperatures not exceeding about 100° C. (e.g., from about 70° C. to about 90° C., from about 70° C. to about 95° C., from about 75° C. to about 90° C., or from about 75° C. to about 95° C.), with lower values (e.g., from about 30° C. to about 70° C., from about 30° C. to about 50° C., or from about 50° C. to about 70° C.) if sorption is carried out at low temperature. Given the different stabilities of the monocarboxylated and dicarboxylated products, it may be possible to operate the desorption in a staged temperature operation with an initial stage at a relatively low temperature and short duration to decompose the dicarboxylated product and a second stage at a higher temperature to decompose the monocarboxylated product. Operation in this manner may be used to eliminate accumulated water from the sorbent by operating the second stage at a temperature above 100° C. while the first stage at the lower temperature may produce a dryer $CO_2$ effluent stream.

Stripping with an inert (non-reactive) gas such as nitrogen and/or a natural gas stream at temperatures at or close to the sorption temperature can be a preferred option for process economics, e.g., at a temperature not more than 10, 20, or 30° C. above the sorption temperature. Another option can be to desorb the $CO_2$ with substantially pure $CO_2$ (previously isolated) at ~1 atm (~100 kPa partial pressure) or higher at relatively high temperatures, typically at least 100° C. or at least 120° C. Water removed from the amine/base solution at desorption temperatures over 100° C. can be separated separately from the $CO_2$ in a further downstream separation step, e.g. by pressure swing operation, preferably at an elevated temperature above ambient. Staged heat exchanger systems with knock out drums where water can be removed first, followed by $CO_2$ as a pressurized gas stream, may be used as one alternative. Selective $CO_2$ capture from wet $CO_2$-containing streams such as flue gas or wet natural gas may thus be achieved.

The absorption pressure can be in the range from about 0.1 barg (about 10 kPag) to about 20 barg (about 2 MPag), for example from about 0.1 barg (about 10 kPag) to about 10 barg (about 1 MPag). The partial pressure of carbon dioxide in the gas mixture can vary according to the gas composition and/or the pressure of operation, but can typically be from about 0.1 barg (about 10 kPag) to about 20 barg (about 2 MPag), for example from about 0.1 barg (about 10 kPag) to about 10 bar (about 1 MPag). The gas mixture can be contacted countercurrently or co-currently with the absorbent material at a gas hourly space velocity (GHSV) from about 50 (S.T.P.)/hour to about 50,000 (S.T.P.)/hour.

The low pressure of flue gas can, in general, represent a significant limitation for $CO_2$ recovery, since the $CO_2$ can be absorbed much more easily at higher pressures, but the cost of compression can be relatively high and can tend not to be favored with the present sorption systems with their high sorption capacities. The pressure when treating flue gas which enters from the combustion source at a low pressure is unlikely to exceed about 1 atmosphere gauge (~100 kPag) unless a separate means is utilized to increase pressure. Natural gas recovery and processing is commonly at a much higher pressure and may enter the treatment process at a pressure typically in the range from about 1 atm (~100 kPag) to about 90 atm (~9.1 MPag), with the actual value selected being dependent on pipelining specifications and/or the extent to which it is desired to eliminate recompression following treatment, for example. All references to values of pressure in units of bars herein are in absolute pressures unless otherwise specifically noted.

It should be appreciated that conventional equipment can be used, in whole or in part, to perform the various functions of the non-aqueous amine scrubbing processes/steps described herein, such as monitoring and/or automatically regulating the flow of gases, e.g., to enable fully automated and/or continuous process control in an efficient manner.

The sorbent system described herein is not necessarily limited to removal of $CO_2$ but, in view of the system chemistry, can be capable of removing $H_2S$ and/or other acid gases such as those typically found in flue gas and/or wellhead natural gas.

EXAMPLES

Example 1

Double Carboxylative $CO_2$ Uptake with APN/TMG Sorbent System

Figure 2:
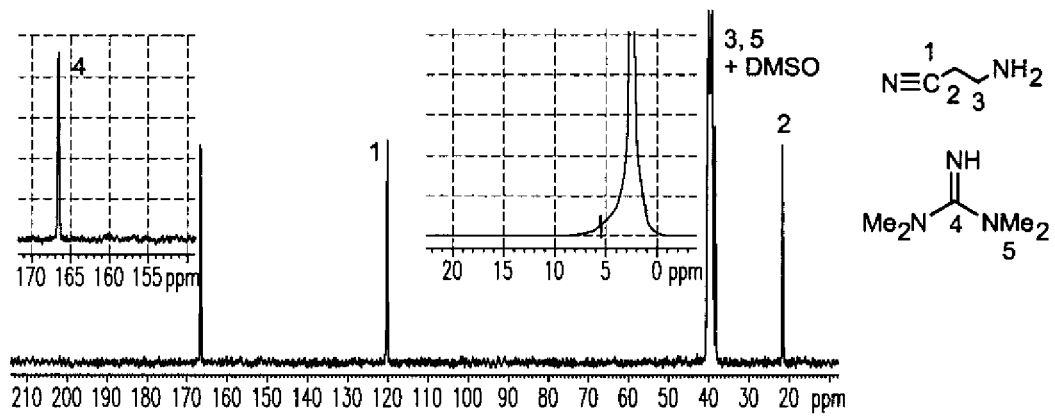
FIG. 2 shows the $^{13}C$ NMR spectra before and after carboxylation of 1,1-aminopropionitrile:tetramethylguanidine.
Figure 2:
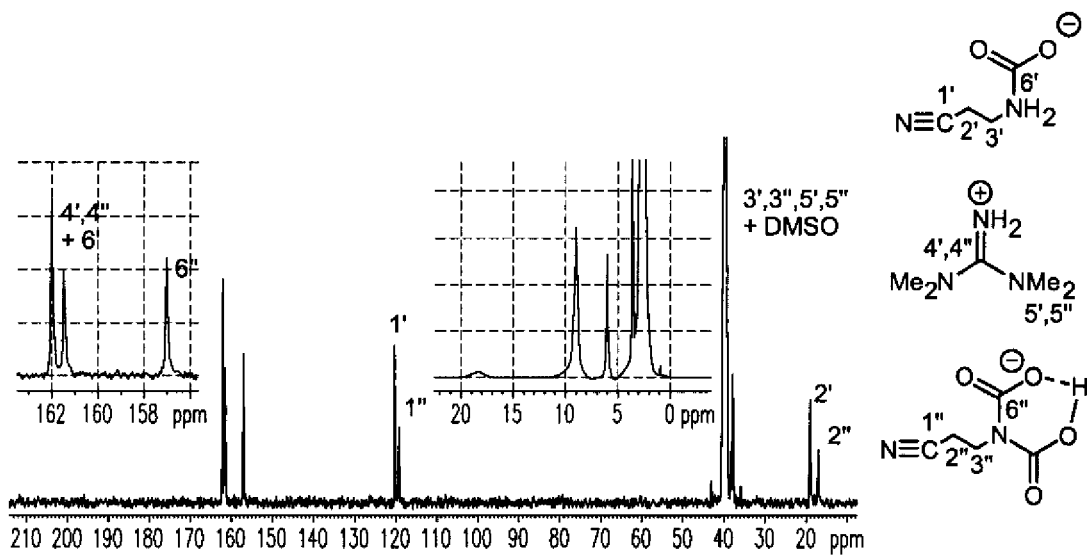

An approximately 22.3 wt % solution of a ~1:1 molar mixture of 3-aminopropionitrile (APN, $pK_a$ ~7.7) and 1,1,3, 3-tetramethylguanidine (TMG) was prepared in $d_6$-DMSO in a ~10 mm NMR tube fitted with a plastic cap and capillary dip tube. The NMR tube was placed inside a ~10 mm wide-bore Bruker Advance 400 MHz NMR spectrometer with a BBO probe. $CO_2$ (~1 atm, or ~100 kPa partial pressure, at a flow of ~5 cc/min, measured by a Brooks 5896 flow controller) was bubbled through the room temperature (~20-25° C.) solution for approximately 3 hours (until no further $CO_2$ uptake was observed). The initial spectra of the starting materials appeared to change upon $CO_2$ addition, as shown in FIG. 2. $^{13}C$ peaks were formed at ~161.45 ppm (monocarbamate) for the first products observed (typically overlapped or near-overlapped with guanidinium C=N resonance) and ~157.04 ppm (dicarbamate) in a ~67:33 ratio (determined by integration of peaks at ~161.45 ppm and ~157.04 ppm over C=N cluster of APN at ~120 ppm). The remaining peaks of the aminopropionitrile structure also appeared to split and to shift in proportion to the two products. The $^1H$ NMR peak at ~18.4 ppm was believed to reflect the dicarboxylation product, while the broad peaks above about 5 ppm were attributed to quaternary N—$\underline{H}$ species. About 67 mol % of the aminopropionitriles were calculated to be monocarboxylated, while ~33 mol % were calculated to be dicarboxylated (total loading of $CO_2$ per aminopropionitrile ~133%; total loading of $CO_2$ per guanidine was ~133% as well, due to ~1:1 molar ratio between the amine and the base). In contrast, a similar solution comprised only of ~15 wt % APN in $d_6$-DMSO (without strong base TMG) produced an ~86 mol % loading of monocarboxylated species under similar conditions.

After desorption at ~30° C. with an $N_2$ purge for ~10 hours through the solution, the $^{13}C$ peak at ~157.04 ppm and the $^1H$ peak at ~18.4 ppm were observed to disappear. At the same time, the monocarboxylate $^{13}C$ peak at ~161.55 ppm showed a higher $CO_2$ loading (~89 mol %), indicating decomposition of dicarboxylates into monocarboxylate species upon desorption at ambient temperature. The dicarboxylated configuration was also not observed to be stable at higher temperatures. With a $CO_2$ purge through the solution at elevated temperature, the total loading of $CO_2$ per aminopropionitrile was ~112% at ~50° C., ~96.2% at ~70° C., and ~92.7% at ~90° C. Monocarboxylated products appeared to remain stable at these conditions.

Example 2

Double Carboxylative $CO_2$ Uptake with 2-ethoxyethylamine/TMG Sorbent System

Figure 3:
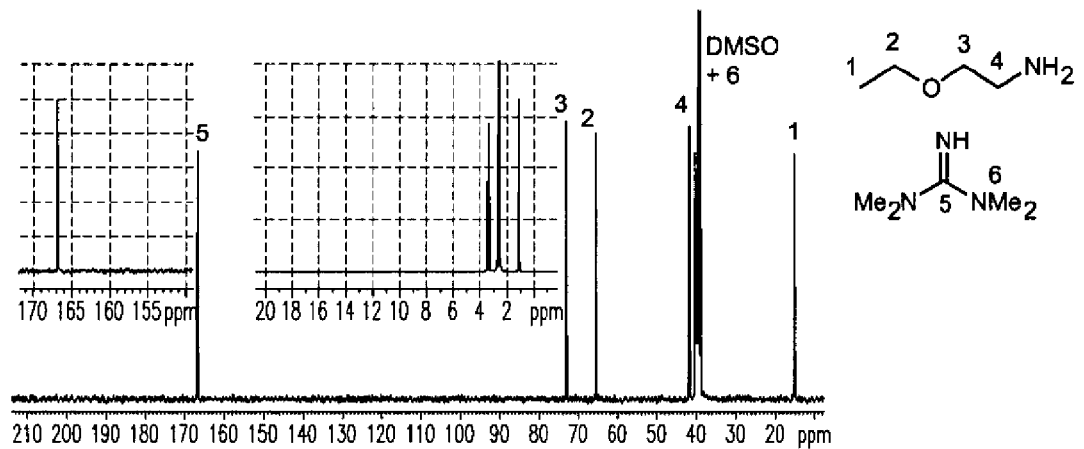
FIG. 3 shows the $^{13}C/^{1}H$ NMR spectra before and after carboxylation of 1,1-ethoxyamine:tetramethylguanidine.
Figure 3:
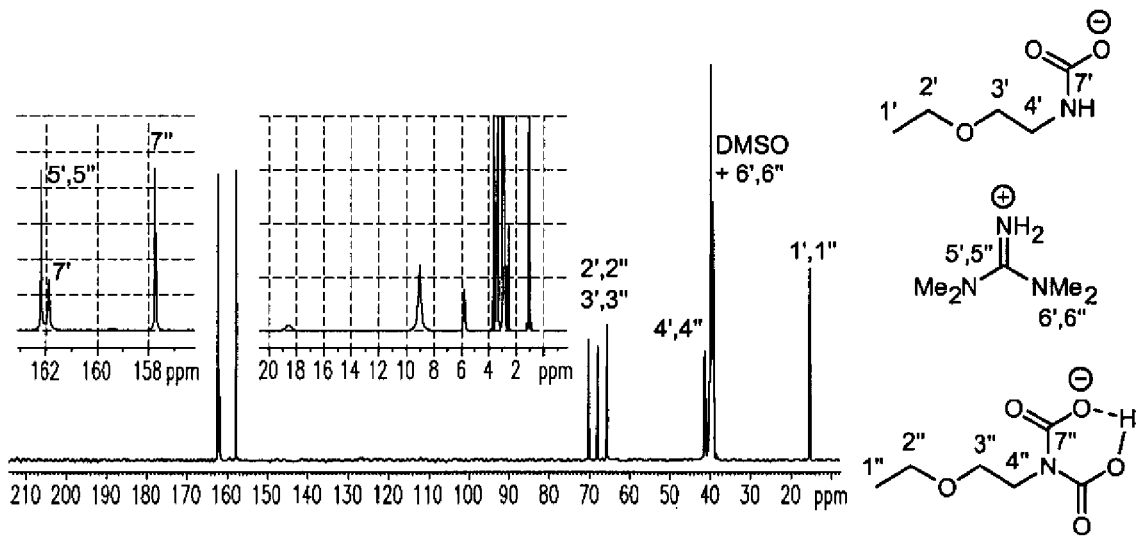

A procedure similar to Example 1 was carried out using a ~1:1 mixture of 2-ethoxyethylamine (predicted $pK_a$ ~8.92) and 1,1,3,3-tetramethylguanidine in $d_6$-DMSO. The NMR spectra are shown in FIG. 3. $^{13}C$ peaks were formed at ~161.89 ppm (monocarbamate) for the first products observed and ~157.74 ppm (dicarbamate). According to integration of the $^{13}C$ NMR spectra peaks at ~70.28 ppm (backbone —O$\underline{C}H_2$— of the monocarboxylated species) and ~68.17 ppm (backbone —O$\underline{C}H_2$— of the dicarboxylated species), ~53 mol % of the ethoxyethylamines were calculated to be monocarboxylated, while ~47 mol % were calculated to be dicarboxylated (total loading of $CO_2$ per ethoxyethylamine ~147%; total loading of $CO_2$ per guanidine ~147%). The $^1H$ NMR peak at ~18.56 ppm was attributed to the dicarboxylation product. In contrast, a similar solution comprised only of ~15 wt % 2-ethoxyethylamine in $d_6$-DMSO (without a separate base) produced an ~81 mol % loading of monocarboxylated species under similar conditions.

A similar procedure was carried out using a ~1:2.2 molar ratio of 2-ethoxyethylamine/tetramethylguanidine. About 29 mol % of the ethoxyethylamines were monocarboxylated, while ~71 mol % were dicarboxylated (total loading of $CO_2$ per ethoxyethylamine ~171%; total loading of $CO_2$ per guanidine ~78%).

Example 3

Figure 4:
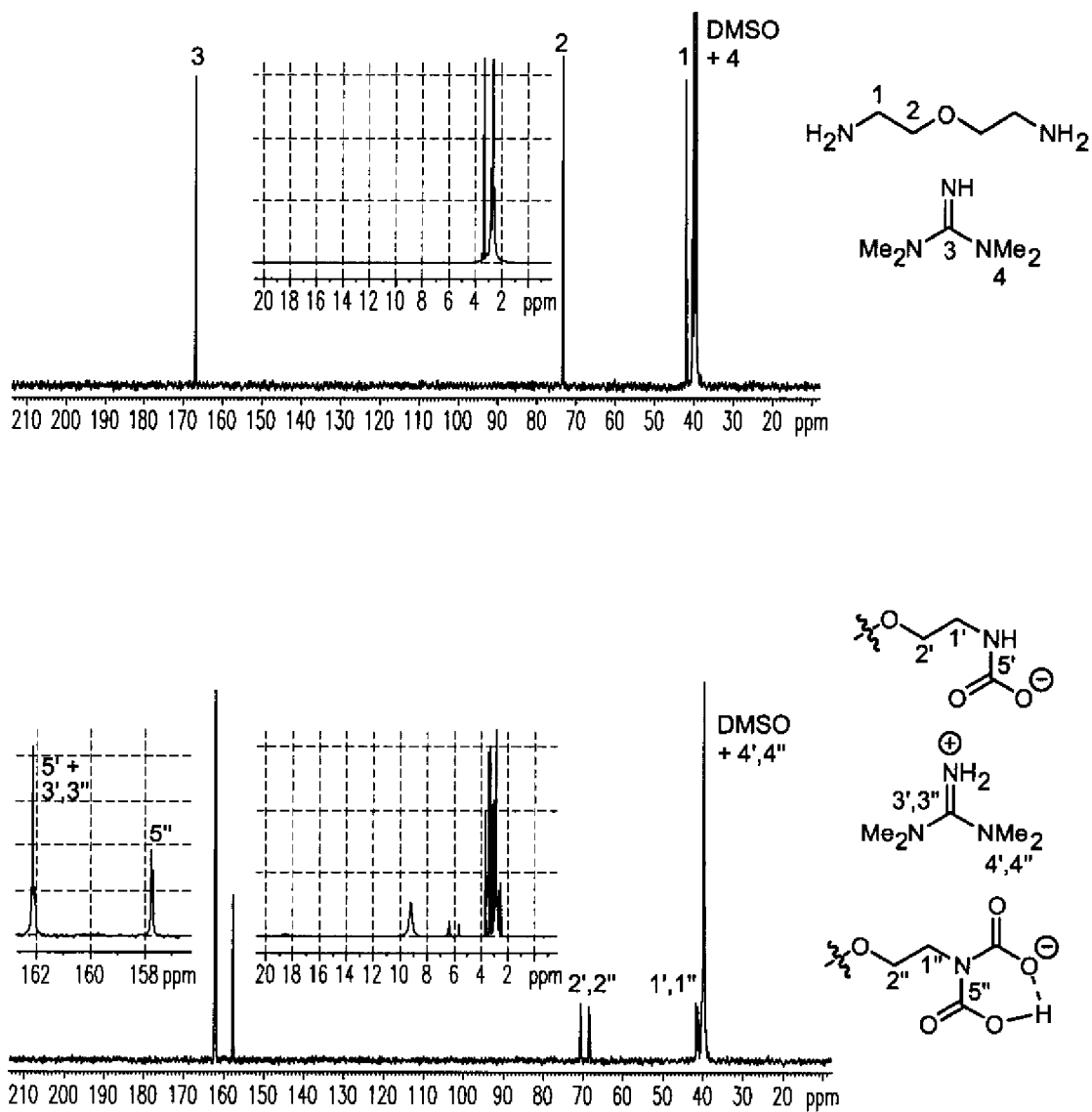
FIG. 4 shows the $^{13}C/^{1}H$ NMR spectra before and after carboxylation of 1,2-oxybis(ethylamine):tetramethylguanidine.

Double Carboxylative $CO_2$ Uptake with 2,2'-oxybis(ethylamine)/TMG Sorbent System A procedure similar to Example 1 was carried out using a ~30 wt % of ~1:2 mixture of 2,2'-oxybis(ethylamine) (predicted pKa ~9.07, also called 1,5-diamino-3-oxapentane) and 1,1,3,3-tetramethylguanidine in $d_6$-DMSO (this works out to a ~1:1 ratio of primary amine groups to guanidines, because of the difunctionality of the amine). The NMR spectra are shown in FIG. 4. Additional splitting of the $^{13}C$ NMR peaks was observed compared to Examples 1-2, because of the possibility of asymmetric products at the two amine sites in oxybis(ethylamine). According to integration of the peaks at ~77.6 ppm (backbone —O$\underline{C}H_2$— of the monocarboxylated species) and ~68.5 ppm (backbone —O$\underline{C}H_2$— of the dicarboxylated species), ~58 mol % of the amine sites in oxybis (ethylamine) were calculated to be monocarboxylated (first product observed), while ~42 mol % were calculated to be dicarboxylated (total loading of $CO_2$ per amine site of oxybis (ethylamine) ~142%; ~284% per molecule; total loading of $CO_2$ per guanidine was ~142%).

In contrast, a similar solution comprised only of ~9.9 wt % oxybis(ethylamine) in $d_6$-DMSO (without added base) produced a ~73 mol % loading of monocarboxylated species per amine site under similar conditions. Higher concentrations of the oxybis(ethylamine) in DMSO appeared to agglomerate after reaction with $CO_2$, which suggested strong intermolecular interactions between reaction products of the difunctional oxybis(ethylamine) molecule.

A similar procedure was carried out using a ~24 wt % of ~1:3.2 molar ratio of oxybis(ethylamine)/tetramethylguanidine (~1:1.6 ratio of primary amine groups to guanidines) in DMSO-$d_6$ (spectra not shown). About 34 mol % of the amine sites in oxybis(ethylamine) were calculated to be monocarboxylated, while ~66 mol % were calculated to be dicarboxylated (total loading of $CO_2$ per oxybis(ethylamine) ~166%; ~332% per molecule; total loading of $CO_2$ per guanidine pairs ~103%).

Another similar procedure was carried out using a ~30 wt % of ~1:4.6 molar ratio of oxybis(ethylamine)/tetramethylguanidine (~1:2.3 ratio of primary amine groups to guanidines) in DMSO-$d_6$. Monocarboxylation products were observed first, followed by the further formation of dicarboxylated species. About 33 mol % of the amine sites in oxybis(ethylamine) were monocarboxylated, while ~67 mol % were dicarboxylated (total loading of $CO_2$ per oxybis(ethylamine) ~167%; ~334% per molecule; total loading of $CO_2$ per guanidine ~73%). After desorption at ~30° C. with an $N_2$ purge through the solution for ~5 hours, the dicarboxylated species were observed to disappear. The dicarboxylated species appeared not to be stable and seemed to completely decompose to monocarboxylates (~99 mol %) upon desorption at ambient temperature.

The results of Examples 1-3 are shown in Table 1 below.

TABLE 1

Results from Examples 1-3

| Amine (pKa) | Non-Nucleophilic Base(pKa) | ΔpKa | Molar Ratio | Mol % Mono:Di* | Mol % $CO_2$ Uptake per 1° Amine (per Base) |
|---|---|---|---|---|---|
| 3-aminopropionitrile (~7.7) NC—$CH_2$—$NH_2$ | 1,1,3,3-TMG (~15.2) | ~7.5 | ~1:1 | ~67:33 | ~133 (~133) |
| 2-ethoxyethylamine (~8.92) $C_2H_5$—O—$C_2H_4$—$NH_2$ | 1,1,3,3-TMG (~15.2) | ~6.28 | ~1:1 | ~53:47 | ~147 (~147) |
| 2-ethoxyethylamine (~8.92) | 1,1,3,3-TMG (~15.2) | ~6.28 | ~1:2.2 | ~29:71 | ~171 (~78) |
| 2,2'-oxybis(ethylamine) (~9.07) $H_2N$—$C_2H_4$—O—$C_2H_4$—$NH_2$ | 1,1,3,3-TMG (~15.2) | ~6.13 | ~1:1# | ~58:42# | ~142 (~142)# |
| 2,2'-oxybis(ethylamine) (~9.07) | 1,1,3,3-TMG (~15.2) | ~6.13 | ~1:1.6# | ~34:66# | ~166 (~103)# |
| 2,2'-oxybis(ethylamine) (~9.07) | 1,1,3,3-TMG (~15.2) | ~6.13 | ~1:2.3# | ~33:67# | ~167 (~73)# |

1,1,3,3-TMG = 1,1,3,3-tetramethylguanidine
*Monocarboxylation (monocarbamate/carbamic acid) or dicarboxylation (dicarbamate/carbamic acid) product formed. Dicarboxylation products are counted as one mole, e.g., one dicarboxylate per one amine. The right-most column counts $CO_2$ moles per mole of amine or base, based on the numbers in the three columns to the left.
Per amine site in oxybis(ethylamine); overall oxybis(ethylamine)/TMG ratios are ~1:2, ~1:3.2, and ~1:4.6, respectively.

Example 4

Vapor-Liquid Equilibrium of EEA/TMG and $CO_2$ in $d_6$-DMSO

An approximately 96.5 wt % solution of ~1:1 molar mixture of ethoxyethylamine (EEA) and tetramethylguanidine (TMG) in $d_6$-DMSO was heated to ~45° C. and then treated with a continuous flow of ~1 vol % $CO_2$ in $N_2$ at ~1 atm (~100 kPag), as described in the General Procedure. The solution was next treated with ~10 vol % $CO_2$ in $N_2$ at ~1 atm (~100 kPag), and then finally ~100 vol % $CO_2$ at ~1 am (~100 kPag). The equilibrium loading of $CO_2$ per amine at these conditions was calculated to be ~108.0, ~114.6, and ~126.7 mol %, respectively (or ~22.5, ~23.8, and ~26.3 solution wt %), and represented an EEA/TMG/$CO_2$ vapor-liquid equilibrium at ~10 mbar (~1 kPa), ~100 mbar (~10 kPa), and ~1 bar (~100 kPa) of $CO_2$ at ~45° C.

Figure 5:
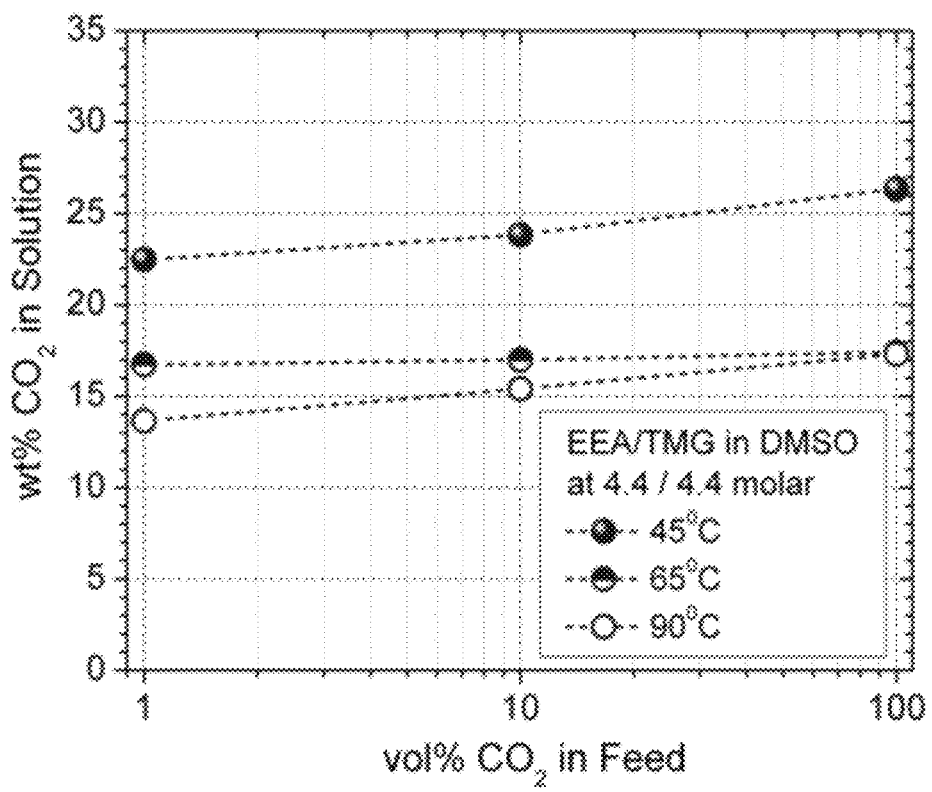
FIG. 5 shows a vapor-liquid equilibrium curve for the EEA/TMG system with $CO_2$ (Example 4).

The same procedure was carried out with a fresh ~1:1 molar mixture of EEA and TMG in DMSO-$d_6$ solution at ~65° C. and ~90° C. The monitoring results shown in FIG. 5 indicated not only a large $CO_2$ uptake capacity (~23.8 solution wt %) at absorber conditions (~45° C., ~10 vol % $CO_2$) but also relatively high $CO_2$ loading at relatively low $CO_2$ fugacity (~22.5 wt % at ~45° C., ~1 vol % $CO_2$). These results appeared to confirm that primary amines (such as EEA) in solution with strong base (such as TMG or other guanidines and amidines) can effectively capture more than ~90% $CO_2$ from flue gas with high capacity. Based on high $CO_2$ loading at ~65° C. and ~90° C. (FIG. 5), such solutions can thus be used for $CO_2$ capture at elevated temperatures (>~60° C.), which can advantageously decrease the hardware and corresponding cost of flue gas cooling.

What is claimed is:

1. A cyclic process for separating $CO_2$ from a gas stream, which process comprises:
   (i) contacting the gas stream with an absorbent comprising a primary amine $CO_2$ sorbent and a non-nucleophilic base having a pKa higher than that of the amine to form a reaction product by dicarboxylation of at least some of the primary amine so as to sorb $CO_2$; wherein the ratio of non-nucleophilic base to primary amine is at least about 1:1; wherein the $CO_2$ capture ratio is between 1:1 and 2:1 (molar, $CO_2$ per amine group of the primary amine) inclusive; and
   (ii) treating the absorbent containing the sorbed $CO_2$ under conditions sufficient to cause desorption of at least a portion of the $CO_2$.

2. The process of claim 1, wherein the $CO_2$ is desorbed from the absorbent containing the sorbed $CO_2$ in the desorption zone at a temperature of not more than 70° C. to cause desorption of at least a portion of the sorbed $CO_2$.

3. The process of claim 1, wherein the primary amine has a pKa not greater than about 10.

4. The process of claim 1, wherein the primary amine has a pKa from 8 to about 10.

5. The process of claim 1, wherein the primary amine is selected from: 2-ethoxyethylamine, 2-n-propoxyethylamine, 1,5-diamino-3-oxapentane, 3-aminopropionitrile, aminoacetonitrile or hydroxyethyl ethylenediamine.

6. The process of claim 1, wherein the non-nucleophilic base comprises an amine, an imine, an amidine or a guanidine.

7. The process of claim 1, wherein the non-nucleophilic base has a pKa of at least 10.

8. The process of claim 1, wherein the non-nucleophilic base has a pKa of at least 13.

9. The process of claim 1, wherein the non-nucleophilic base comprises tetramethylguanidine.

10. The process of claim 1, wherein the gas stream is contacted with the absorbent at a temperature from ambient to 70° C.

11. The process of claim 10, wherein the gas stream is contacted with the absorbent at a temperature of 20 to 50° C.

12. The process of claim 1, wherein the $CO_2$ is desorbed from the absorbent containing the sorbed $CO_2$ at a temperature of not more than 90° C. to cause desorption of at least a portion of the sorbed $CO_2$.

13. The process of claim 12, wherein the $CO_2$ is desorbed from the absorbent containing the sorbed $CO_2$ at a temperature from 50 to 70° C.

14. A cyclic process for separating $CO_2$ from a gas stream, which process comprises:
  (i) contacting the gas stream in a sorption zone with a liquid absorbent comprising a primary aliphatic amine $CO_2$ sorbent and a non-nucleophilic base having a pKa higher than that of the amine in a polar solvent, to sorb $CO_2$ by chemisorption in the amine at a $CO_2$:amine ratio (molar, $CO_2$ per amine group of the primary amine) of between 1:1 and 2:1, inclusive; wherein the ratio of non-nucleophilic base to primary amine is at least about 1:1;
  (ii) passing the liquid absorbent containing the sorbed $CO_2$ to a desorption zone to liberate $CO_2$ from the $CO_2$-containing absorbent liquid and regenerate the absorbent liquid by treating the absorbent containing the sorbed $CO_2$ under conditions sufficient to cause desorption of at least a portion of the $CO_2$; and
  (iii) returning the absorbent liquid from which the $CO_2$ has been liberated to the sorption zone.

15. The process of claim 14, wherein the non-nucleophilic base has a pKa of at least 10.

16. The process of claim 14, wherein the non-nucleophilic base has a pKa of at least 13.

17. The process of claim 14, wherein the primary amine has a pKa not greater than 9.

18. The process of claim 14, wherein the $CO_2$ is sorbed by chemisorption in the amine at a $CO_2$:amine ratio (molar, $CO_2$ per amine group of the primary amine) over 1:1.

19. The process of claim 18, wherein the $CO_2$ is sorbed by chemisorption in the amine to form a reaction product by dicarboxylation of at least some of the primary amine.

20. The process of claim 14, wherein the gas stream is contacted with the absorbent in the sorption zone at a temperature from ambient to 50° C.

* * * * *